United States Patent
Ono et al.

(10) Patent No.: US 8,582,126 B2
(45) Date of Patent: Nov. 12, 2013

(54) SUPPORT METHOD FOR SIMULATING A PRINTING OPERATION

(75) Inventors: Toru Ono, Toyota (JP); Masahiro Serizawa, Toride (JP); Hideyuki Ikegami, Abiko (JP); Akira Morisawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1540 days.

(21) Appl. No.: 11/853,441

(22) Filed: Sep. 11, 2007

(65) Prior Publication Data

US 2008/0068669 A1 Mar. 20, 2008

(30) Foreign Application Priority Data

Sep. 20, 2006 (JP) ................................. 2006-254978

(51) Int. Cl.
*G06F 3/12* (2006.01)

(52) U.S. Cl.
USPC .......... 358/1.13; 358/1.5; 358/1.12; 358/504; 703/13; 703/20; 703/21; 703/23; 703/24

(58) Field of Classification Search
USPC ....................................................... 358/1.13
See application file for complete search history.

(56) References Cited

U.S. PATENT DOCUMENTS

| | | | | |
|---|---|---|---|---|
| 5,844,819 | A * | 12/1998 | Fujinuma ........................ | 703/7 |
| 7,363,209 | B2 * | 4/2008 | Kuschel et al. ................ | 703/20 |
| 7,580,815 | B2 * | 8/2009 | Kawakami et al. ............. | 703/2 |
| 2005/0082737 | A1 | 4/2005 | Sasaki et al. ................ | 271/9.12 |
| 2006/0077246 | A1 * | 4/2006 | Kawakami et al. ........... | 347/104 |
| 2006/0077425 | A1 | 4/2006 | Nakata et al. ................ | 358/1.15 |
| 2006/0079980 | A1 * | 4/2006 | Ikegami et al. ................ | 700/97 |
| 2006/0088323 | A1 * | 4/2006 | Morisawa et al. .............. | 399/21 |
| 2006/0100842 | A1 * | 5/2006 | Dominguez et al. ............ | 703/20 |
| 2006/0129364 | A1 * | 6/2006 | Ikegami et al. .................... | 703/6 |
| 2006/0159499 | A1 | 7/2006 | Watanabe et al. ............. | 399/391 |
| 2006/0220305 | A1 | 10/2006 | Serizawa et al. ............. | 271/262 |
| 2007/0143089 | A1 * | 6/2007 | Sakai et al. ...................... | 703/13 |
| 2007/0288218 | A1 * | 12/2007 | Ikegami et al. ................. | 703/13 |
| 2008/0065367 | A1 * | 3/2008 | Serizawa et al. ................ | 703/13 |

FOREIGN PATENT DOCUMENTS

| | | |
|---|---|---|
| CN | 1758209 | 4/2006 |
| JP | 5-143260 | 6/1993 |
| JP | 9-081600 | 3/1997 |
| JP | 2005-148676 A | 6/2005 |
| JP | 2006-134060 A | 5/2006 |
| JP | 2006-178728 A | 7/2006 |

OTHER PUBLICATIONS

Chinese Office Action, dated Dec. 12, 2008, issued in Chinese Application No. 200710153038.2.
Japanese Refusal, dated Oct. 24, 2011, issued by the Japanese Patent Office in Japanese Patent Application No. 2006-254978.

* cited by examiner

*Primary Examiner* — Benjamin O Dulaney
(74) *Attorney, Agent, or Firm* — Fitzpatrick, Cella, Harper & Scinto

(57) ABSTRACT

A design support method of verifying control on a device of an image forming apparatus registers, in a storage device, trigger information for specifying a content of control to be executed when a start condition for switching the control state of the device is satisfied (S1002). The apparatus then registers, in the storage device, the allowable range of the state change of the device due to control switched when the start condition is satisfied (S1003). The apparatus then verifies whether the state change of the device due to the control switched when the start condition is satisfied falls outside the allowable range, by referring to the operation state of the device which is input through an input unit, and the trigger information registered in the storage device (S1004).

11 Claims, 21 Drawing Sheets

FIG. 2B

| VERIFICATION ITEM | ALLOWABLE RANGE | | CALCULATED VALUE OF STATE CHANGE | DETERMINATION |
| --- | --- | --- | --- | --- |
| | ALLOWABLE VALUE MIN | ALLOWABLE VALUE MAX | | |
| T2~T3 | 0 | 200 | 210 | NG |

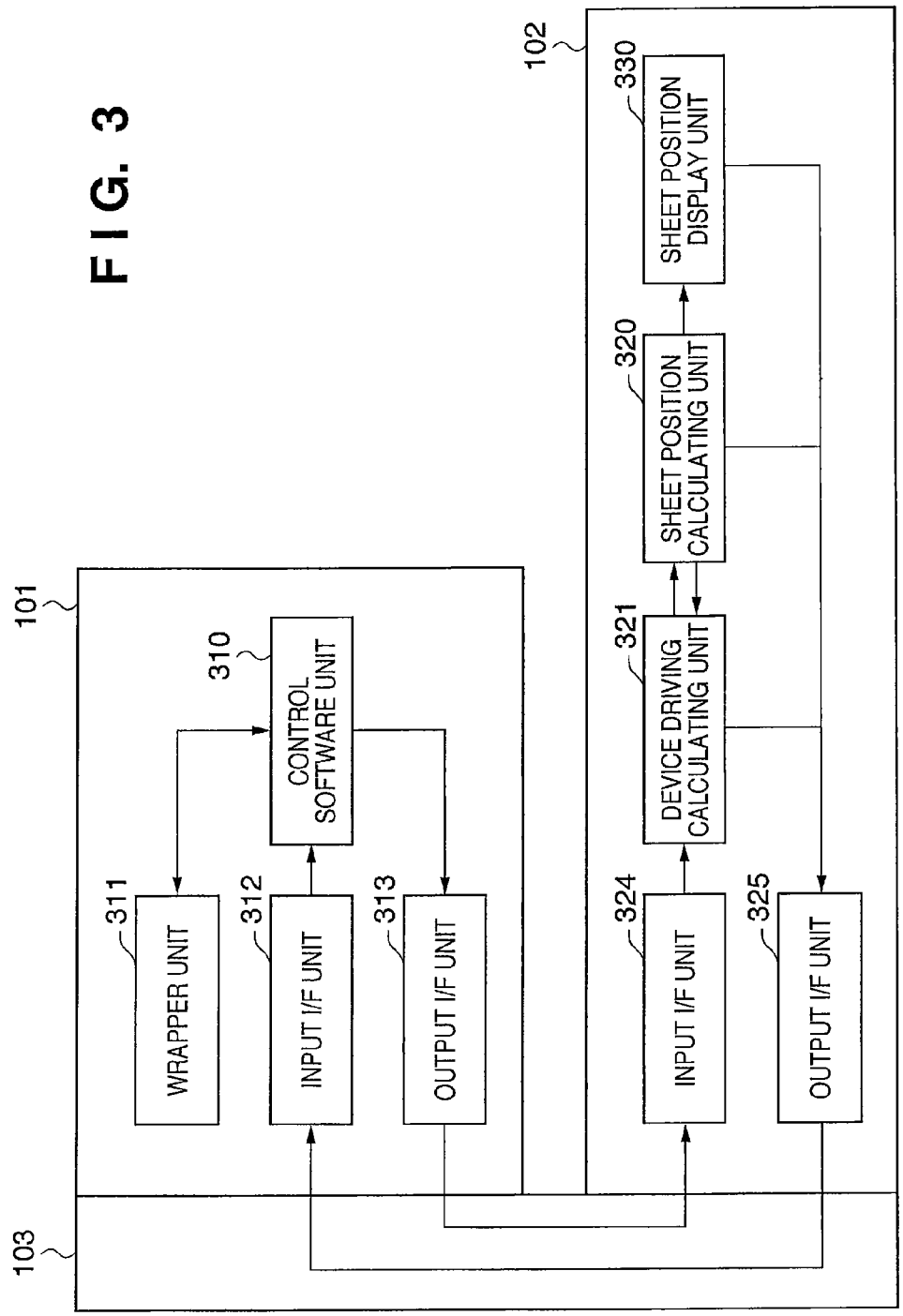

FIG. 11

| # | CONTROL TARGET | TYPE | CONTROL ITEM | SET VALUE |
|---|---|---|---|---|
| 1 | R1 | ROLLER DRIVING | ACCELERATION A | 1500 |
| 2 | R1 | ROLLER DRIVING | ACCELERATION B | 2000 |
| 3 | R1 | ROLLER DRIVING | DECELERATION A | 2000 |
| 4 | R2 | ROLLER DRIVING | ACCELERATION A | 1500 |
| 5 | R2 | ROLLER DRIVING | ACCELERATION B | 2000 |
| 6 | R2 | ROLLER DRIVING | DECELERATION A | 2000 |
| 7 | R3 | ROLLER DRIVING | ACCELERATION A | 1500 |
| 8 | R3 | ROLLER DRIVING | DECELERATION A | 1500 |
| 9 | R4 | ROLLER DRIVING | ACCELERATION A | 1500 |
| 10 | R4 | ROLLER DRIVING | DECELERATION A | 1500 |
| 11 | R4 | HIGH VOLTAGE CONTROL | ON | 50000 |
| 12 | R4 | HIGH VOLTAGE CONTROL | OFF | 50000 |
| ... | | | | |

| REGISTRATION NUMBER | TRIGGER SELECTION | CONTROL - START CONDITION | | | | CONTROL - TRIGGER | | | PHENOMENON | | |
|---|---|---|---|---|---|---|---|---|---|---|---|
| | | NUMBER OF TIMES | CONTROL TARGET | TYPE | PHENOMENON | CONTROL TARGET | TYPE | CONTROL | NUMBER OF TIMES | CONTROL TARGET | PHENOMENON |
| T1 | CONTROL | 3 | R3 | ROLLER | SEPARATION OF TRAILING EDGE | R3 | ROLLER | START OF DECELERATION | | | |
| T2 | CONTROL | 3 | R3 | ROLLER | SEPARATION OF TRAILING EDGE | R3 | ROLLER | COMPLETION OF DECELERATION | | | |
| T3 | PHENOMENON | | | | | | | | 4 | R3 | STRIKING OF LEADING EDGE |
| T4 | CONTROL | n | R2 | ROLLER | SEPARATION OF TRAILING EDGE | R2 | ROLLER | START OF ACCELERATION | | | |
| T5 | CONTROL | n | R2 | ROLLER | SEPARATION OF TRAILING EDGE | R2 | ROLLER | COMPLETION OF ACCELERATION | | | |
| T6 | PHENOMENON | | | | | | | | n+1 | R2 | STRIKING OF LEADING EDGE |
| T7 | PHENOMENON | | | | | | | | n | R4 | SEPARATION OF TRAILING EDGE |
| T8 | CONTROL | n | R4 | ROLLER | SEPARATION OF TRAILING EDGE | R4 | HIGH VOLTAGE | START OF OFF CONTROL | | | |
| T9 | CONTROL | n | R4 | ROLLER | SEPARATION OF TRAILING EDGE | R4 | HIGH VOLTAGE | COMPLETION OF OFF CONTROL | | | |
| T10 | PHENOMENON | | | | | | | | n | R3 | STRIKING OF LEADING EDGE |
| T11 | CONTROL | n | R3 | ROLLER | STRIKING OF LEADING EDGE | R3 | ROLLER | START OF ACCELERATION | | | |
| T12 | CONTROL | n | R3 | ROLLER | STRIKING OF LEADING EDGE | R3 | ROLLER | COMPLETION OF ACCELERATION | | | |
| ... | | | | | | | | | | | |

FIG. 13

| # | COMPARISON TARGET | | ALLOWABLE RANGE | |
| --- | --- | --- | --- | --- |
| | REGISTRATION NUMBER 1 | REGISTRATION NUMBER 2 | MINIMUM ALLOWABLE VALUE (Min) | MAXIMUM ALLOWABLE VALUE (Max) |
| 1 | T1 | T3 | 100 | 300 |
| 2 | T2 | T3 | 0 | 200 |
| 3 | T4 | T6 | 100 | 600 |
| 4 | T5 | T6 | 0 | 500 |
| 5 | T7 | T8 | 0 | 10 |
| 6 | T7 | T9 | 100 | 110 |
| 7 | T10 | T11 | 100 | 600 |
| 8 | T10 | T12 | 0 | 500 |
| ... | | | | |

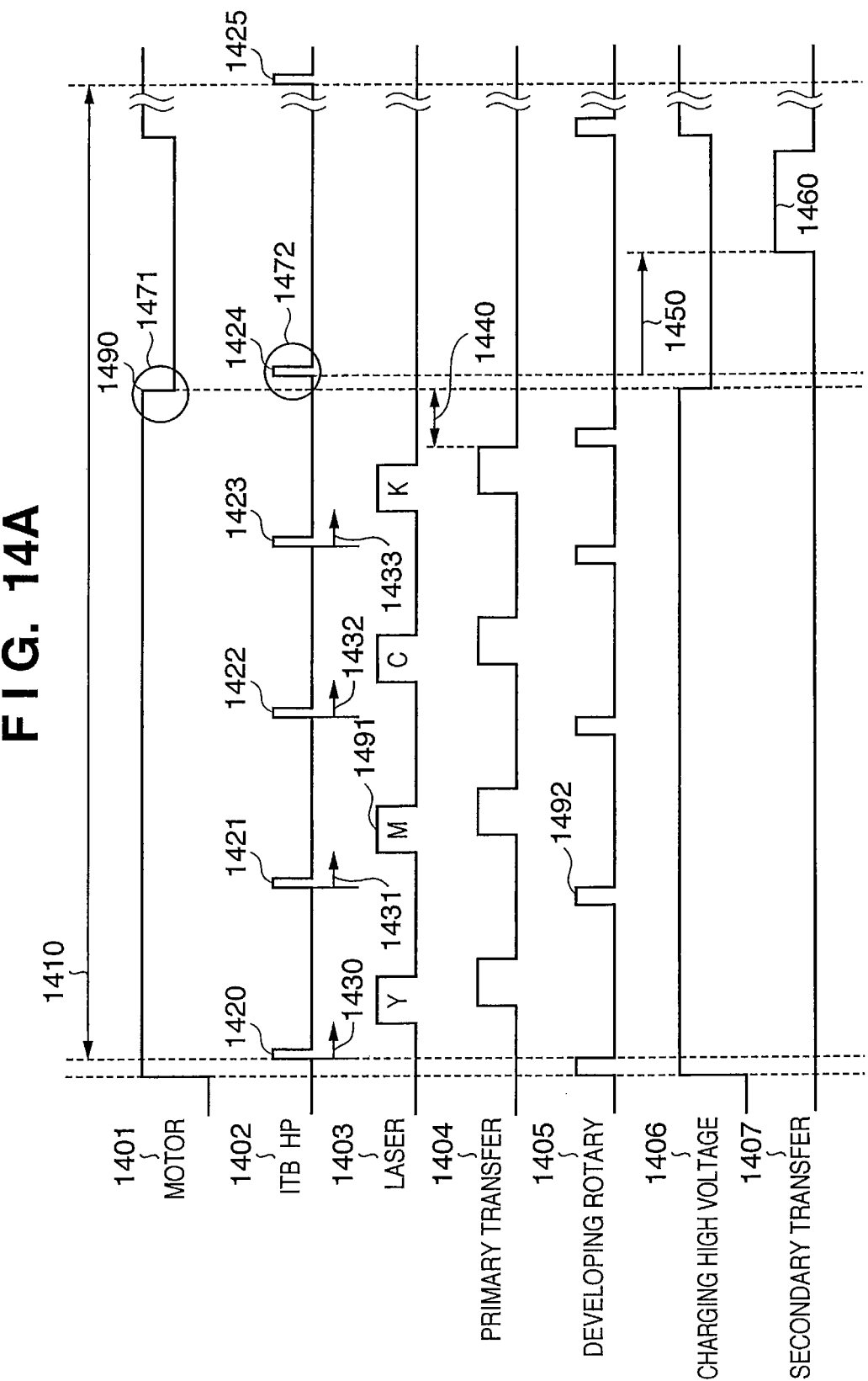

F I G. 14B

| VERIFICATION ITEM | ALLOWABLE RANGE | | ACTUALLY MEASURED VALUE BASED ON LOG INFORMATION | DETERMINATION |
| --- | --- | --- | --- | --- |
| | ALLOWABLE VALUE MIN | ALLOWABLE VALUE MAX | | |
| T165~T166 | 400 | 430 | 380 | NG |

FIG. 16

| REGISTRATION NUMBER | NUMBER OF TIMES | START CONDITION | | | | | TRIGGER | | | |
|---|---|---|---|---|---|---|---|---|---|---|
| | | COLOR | LOAD | TYPE | PHENOMENON/CONTROL | | LOAD | TYPE | PHENOMENON/CONTROL | |
| T161 | n | K | PRIMARY TRANSFER | HIGH VOLTAGE | COMPLETION OF OFF CONTROL | | ITB | MOTOR | START OF DECELERATION | |
| T162 | n | K | PRIMARY TRANSFER | HIGH VOLTAGE | COMPLETION OF OFF CONTROL | | ITB | MOTOR | COMPLETION OF DECELERATION | |
| T163 | n | K | PRIMARY TRANSFER | HIGH VOLTAGE | COMPLETION OF OFF CONTROL | | ITB | SENSOR | DETECTION OF HP | |
| T164 | n | Y | LASER | LD | END OF EXPOSURE | | DR | MOTOR | START OF ACCELERATION | |
| T165 | n | Y | LASER | LD | END OF EXPOSURE | | DR | MOTOR | COMPLETION OF DECELERATION | |
| T166 | n | Y | LASER | LD | END OF EXPOSURE | | LASER | LD | START OF EXPOSURE | |
| ⋮ | | | | | | | | | | |

F I G. 17

| # | COMPARISON TARGET | | ALLOWABLE RANGE | |
|---|---|---|---|---|
| | REGISTRATION NUMBER 1 | REGISTRATION NUMBER 2 | MINIMUM ALLOWABLE VALUE (Min) | MAXIMUM ALLOWABLE VALUE (Max) |
| 1 | T161 | T163 | 100 | 150 |
| 2 | T162 | T163 | 0 | 50 |
| 3 | T164 | T166 | 800 | 830 |
| 4 | T165 | T166 | 400 | 430 |
| ... | | | | |

1701, 1702, 1703, 1704

SUPPORT METHOD FOR SIMULATING A PRINTING OPERATION

BACKGROUND OF THE INVENTION

1. Field of the Invention

The present invention relates to a design support technique for an image forming apparatus.

2. Description of the Related Art

Software controls the operations of various kinds of devices. For example, in an image forming apparatus, in order to convey a recording member (to be referred to as a "sheet" hereinafter) to a predetermined position in a predetermined time using a conveyance mechanism including rollers, guides, and the like, control software controls the conveyance mechanism to convey the sheet. In many sheet conveyance control operations, it rarely suffices to simply convey a sheet at a constant velocity in one direction. For example, software implements the control operation of, for example, detecting the position of a sheet using a sensor, stopping the sheet at a predetermined position, and reversing the conveyance direction of the sheet by reversing conveyance rollers.

FIGS. 15A and 15B are graphs showing an example of conveyance control for a plurality of target conveyance members (sheets 1501 and 1502). FIG. 15A is a graph showing the positions of the leading edges (to be referred to as "leading edges" hereinafter) and the positions of the trailing edges (to be referred to as "trailing edges" hereinafter) of the sheets 1501 and 1502 in a conveyance mechanism in terms of the relationship between conveyance rollers R1 to R4 and the time. Referring to FIG. 15A, "R11" indicates that the leading edge of the sheet 1501 has reached the roller R1 at time t11. The trailing edge of the sheet 1501 reaches the roller R1 at time t12. In this case, the time required for the sheet 1501 to pass through the roller R1 is t12–t11. FIG. 15B is a graph showing the relationship between the driving velocity of the roller R1 and the time. The roller R1 starts rotating at time t0 and reaches a conveyance velocity (target velocity) V1 for conveying the sheet 1501 at time t01. The roller R1 starts decelerating after time t12 when the trailing edge of the sheet 1501 passes through the roller R1.

Referring to FIG. 15A, the leading edge of the sheet 1501 is conveyed to the roller R3 at time t31 (R31). The roller R3 is at rest until time t32 (R32). For example, in conveyance control on the sheets 1501 and 1502 shown in FIG. 15A, for skew correction of each sheet, conveyance is in some cases temporarily stopped to form a loop on the leading edge of each sheet at the roller R3. This temporary stopping state is indicated as a flat state (between the rollers R31 and R32) wherein the conveyance distance does not change between times t31 and t32.

In this case, the conveyance of the sheet 1501 is temporarily stopped at timing R31, and is started at timing R32. After the trailing edge of the sheet 1501 leaves the roller R3 at timing R33 (time t33), it is necessary to stop the roller R3 for skew correction of the sheet 1502 (time t34). The time difference is very small between timing R33 (time t33) when the trailing edge of the sheet 1501 leaves the roller R3 and timing R34 (time t34) when the leading edge of the sheet 1502 strikes the roller R3. If the rotation of the roller R3 is not reliably stopped during this period, it is impossible to form a sufficient loop for skew correction on the leading edge of the sheet 1502 when the sheet is temporarily stopped at the roller R3.

When the image forming apparatus outputs the sheet 1502 with an erroneous image with a problem such as a skew, the apparatus determines whether the cause of the skew resides on the image forming unit side or the sheet conveyance system side, thereby classifying the causes of the problem.

If the cause of the skew resides on the sheet conveyance system side, physical conditions are checked by examining, for example, at which position on a conveyance path the sheet scratches a conveyance guide or if any problem has occurred on the shape of the conveyance guide.

If there is no problem in the physical conditions, control system conditions are checked by examining whether the rollers constituting a conveyance mechanism rotate/stop (ON/OFF) at proper timings. For example, referring to FIG. 15A, a verification is made on the operation of the roller R3 for sheet skew correction after the trailing edge of the sheet 1501 leaves the roller R3 at timing R33. Although timing R34 when the roller R3 starts stopping is normal, the deceleration time from the instant the roller R3 starts stopping to the instant the roller completely stops is longer than the design value. In this case, the leading edge of the succeeding sheet 1502 strikes the roller R3 before the roller R3 completely stops. This allows to specify that the skew has occurred because a sufficient loop for skew correction has not been formed.

Many steps are required to specify the cause of a phenomenon that has occurred, resulting in deterioration of design efficiency.

With recent advances in the performance of image forming apparatuses, control software itself has become complex. If, therefore, control software includes a defective portion, the number of steps necessary to find the defect, specify its cause, and correct the defect also increases.

In order to decrease the number of such steps, there is an increase in the use of simulation techniques for the design of conveyance mechanisms.

For example, according to the design support technique disclosed in patent reference 1 (Japanese Patent Laid-Open No. 9-81600), there is proposed a system which calculates the behavior of a target conveyance member by simulation, generates a timing chart for conveyance mechanism operation, and displays it, thereby verifying the mechanical operation of the conveyance mechanism.

In addition, patent reference 2 (Japanese Patent Laid-Open No. 5-143260) discloses an arrangement for generating external events, e.g., switching on/off printer control software and opening/closing a cover using an input device such as a keyboard.

Patent reference 1, however, discloses no verification technique for control software for evaluating the setting of a timing for controlling a control target and a change in the state of the control target. The technique disclosed in patent reference 1 can specify the cause of a potential problem in the mechanism but is difficult to specify the cause of a potential problem in software for controlling the mechanism.

The technique disclosed in patent reference 2 is designed to verify a problem in software associated with exceptional processing such as generating an external event, e.g., opening/closing the cover, and shifting the image forming apparatus in a normal operation state to a maintenance state or the like. It is therefore difficult to verify control software for controlling the image forming operation, sheet conveyance operation, and the like of an image forming apparatus and specify the cause of a problem if it has occurred.

SUMMARY OF THE INVENTION

The present invention has been made in consideration of the above problems in the prior art, and has as its object to provide a design support technique which allows to efficiently verify control software for controlling an apparatus.

According to one aspect of the present invention, there is provided a design support method of verifying control on a device of an image forming apparatus, the method comprising the steps of: registering, in a storage unit, trigger information for specifying a content of control to be executed when a start condition for switching a control state of the device is satisfied; registering, in the storage unit, an allowable range of a state change of the device due to control switched when the start condition is satisfied; and verifying whether the state change of the device due to the control switched when the start condition is satisfied falls outside the allowable range, by referring to an operation state of the device which is input through an input unit, and the trigger information registered in the storage unit.

According to another aspect of the present invention, there is provided a design support apparatus which verifies control on a device of an image forming apparatus, the apparatus comprising: a trigger information registration unit adapted to register, in a storage unit, trigger information for specifying a content of control to be executed when a start condition for switching a control state of the device is satisfied; an allowable value registration unit adapted to register, in the storage unit, an allowable range of a state change of the device due to control switched when the start condition is satisfied; and a verification unit adapted to verify whether the state change of the device due to the control switched when the start condition is satisfied falls outside the allowable range, by referring to an operation state of the device which is input through an input unit, and the trigger information registered in the storage unit.

According to the present invention, it is possible to efficiently verify control software for controlling an apparatus.

Further features of the present invention will become apparent from the following description of exemplary embodiments (with reference to the attached drawings).

BRIEF DESCRIPTION OF THE DRAWINGS

FIG. 2B is a view showing a display example for notifying an abnormal state;

FIG. 3 is a block diagram showing the arrangements of a software simulation unit 101 and mechanism simulation unit 102 which constitute the design support apparatus;

FIG. 11 is a view exemplarily showing the profiles of rollers as control targets;

FIG. 12 is a view showing an example of the registration of triggers;

FIG. 13 is a view showing an example of the setting of allowable values for state changes;

FIG. 14A is a timing chart for a case wherein a full-color image is to be formed on thick paper;

FIG. 14B is an exemplary view showing an identification indication in a case wherein the verification result of "verifying whether deceleration of a rotating color developing device 933 is complete (T165) before the start of exposure by a laser diode (T166)" exceeds an allowable range;

FIG. 16 is a view showing an example of the registration of control triggers for switching control operations for mechanical units constituting an image forming unit;

FIG. 17 is a view showing an example of the setting of allowable values for state changes;

DESCRIPTION OF THE EMBODIMENTS

The preferred embodiments of the present invention will be exemplarily described in detail below with reference to the accompanying drawings. The constituent elements described in these embodiments are merely examples, and the scope of the present invention is not limited to them.

First Embodiment

Arrangement of Design Support Apparatus

Figure 1:
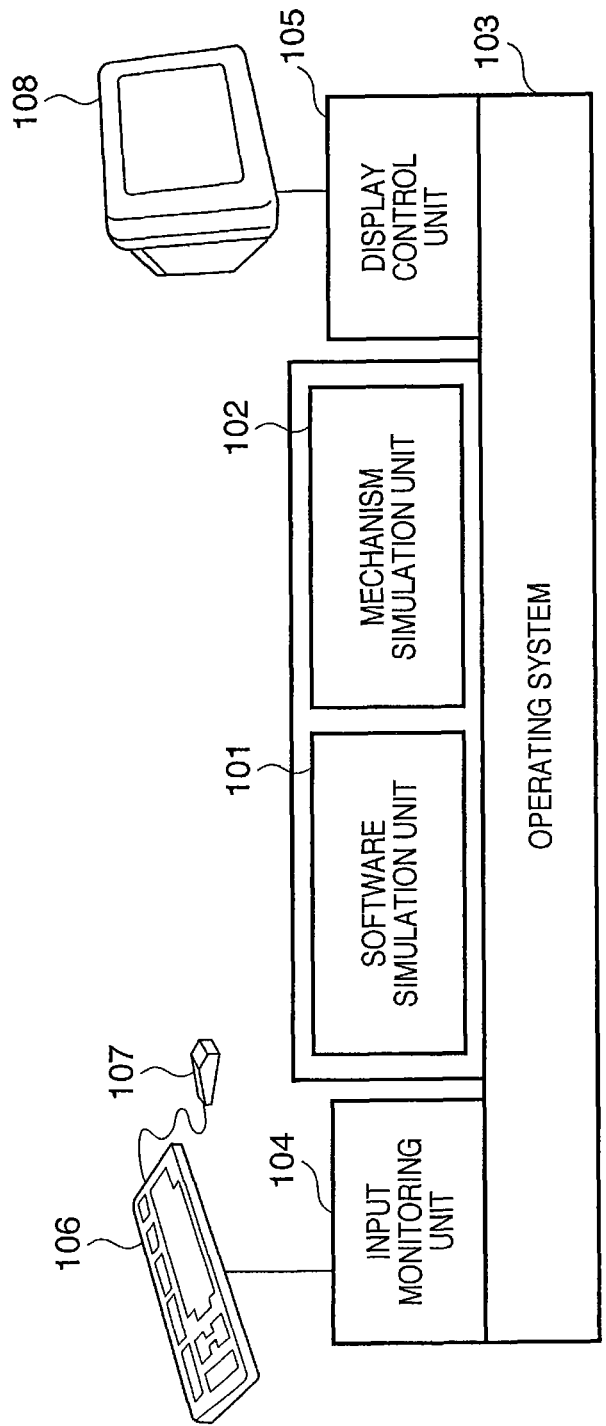
FIG. 1 is a block diagram showing the arrangement of a design support apparatus according to the first embodiment.

FIG. 1 is a block diagram showing the arrangement of a design support apparatus according to the first embodiment. The design support apparatus performs an operation simulation for firm ware/software (to be referred to as "control software" hereinafter) for controlling the image forming apparatus on an information processing apparatus (to be referred to as a "PC" hereinafter). The design support apparatus sets the timing when the control software controls the image forming apparatus and verifies the state changes of devices constituting the image forming apparatus as a control target on the basis of the result of the operation simulation.

A software simulation unit 101 causes the control software for controlling the operation of the image forming apparatus to virtually operate on the PC. In addition, the design support apparatus can verify the control software for controlling the operation of the actual image forming apparatus by combining the image forming apparatus with the virtual operation of the control software.

An input monitoring unit 104 monitors inputs from a keyboard 106, mouse 107, and the like which constitute a man-machine interface. An operating system (to be referred to as an "OS" hereinafter) 103 receives an execution start request from the input monitoring unit 104. The software simulation unit 101 starts a simulation on the control software in response to an instruction from the OS 103.

A mechanism simulation unit 102 sequentially receives the result obtained by executing the simulation on the control software by the software simulation unit 101 through the OS 103. When, for example, performing a simulation concerning the position of a sheet, the mechanism simulation unit 102 can obtain, by calculation, information indicating in which portion in the recording member conveyance mechanism the sheet exists, from the velocities and the like of rollers associated with sheet conveyance control.

In addition, with regard to the position of an image to be formed on a sheet, the mechanism simulation unit 102 can obtain, by calculation, information indicating to which portion of the sheet the image is transferred, from the diameters, rotational speeds, and the like of a photosensitive drum and intermediate transfer belt which are associated with image formation. A display control unit 105 receives the obtained position information of the image through the OS 103.

A display 108 displays the simulation result under the control of the display control unit 105.

FIG. 3 is a block diagram showing the arrangement of the software simulation unit 101 and mechanism simulation unit 102 which constitute the design support apparatus. Although the OS 103 exists between the software simulation unit 101 and the mechanism simulation unit 102, the arrangements of the software simulation unit 101 and mechanism simulation unit 102 will be mainly described.

The software simulation unit 101 comprises a control software unit 310, wrapper unit 311, input I/F unit 312, and output I/F unit 313.

The control software unit 310 comprises control software for controlling the image forming operation of an actual image forming apparatus. The wrapper unit 311 executes the control software for the actual image forming apparatus on the PC. When the control software unit 310 has received information output from the mechanism simulation unit 102, the wrapper unit 311 can execute the control software on the PC in consideration of the received information. The control software unit 310 receives the execution result from the wrapper unit 311. The input I/F unit 312 inputs the information output from the mechanism simulation unit 102 to the control software unit 310. The output I/F unit 313 outputs the information from the control software unit 310. The mechanism simulation unit 102 receives the information output from the output I/F unit 313.

The mechanism simulation unit 102 comprises a sheet position calculating unit 320, device driving calculating unit 321, input I/F unit 324, output I/F unit 325, and sheet position display unit 330.

The input I/F unit 324 receives information output from the output I/F unit 313 of the software simulation unit 101. The input I/F unit 324 inputs sheet conveyance control information from the software simulation unit 101, control information for various kinds of devices such as motors, clutches, and flappers, which are associated with various kinds of device control operations, and the like to the device driving calculating unit 321.

The device driving calculating unit 321 drives devices such as virtual rollers, fans, and the like obtained by modeling an image forming apparatus in accordance with the sheet conveyance control information from the software simulation unit 101, control information for various kinds of devices, and image formation control information. The sheet position calculating unit 320 and the output I/F unit 325 receive an output result from the device driving calculating unit 321. If, for example, a device to be controlled is a fan motor, the device driving calculating unit 321 calculates an output value such as a lock signal for the fan motor, and outputs the output value through the output I/F unit 325.

The sheet position calculating unit 320 stores the positional information of each virtual device in the simulation. The sheet position calculating unit 320 stores, for example, path information including the identification information (ID) of each of a virtual roller, virtual flapper, virtual sensor, and the like and corresponding position information in the sheet conveyance path. The sheet position calculating unit 320 rotates the virtual roller in accordance with the sheet conveyance control information from the software simulation unit 101. The sheet position calculating unit 320 then calculates and stores a virtual position in the sheet conveyance path in accordance with the stored position of the virtual roller and the rotational speed. The sheet position calculating unit 320 also switches the sheet conveyance path using the virtual flapper, and determines the output state of the virtual sensor in accordance with the position of the sheet in the simulation.

The device driving calculating unit 321 stores the position information of each virtual device in the simulation. The device driving calculating unit 321 stores, for example, the positions of image forming devices such as a virtual photosensitive drum and a virtual intermediate transfer belt in the apparatus. The device driving calculating unit 321 rotates the virtual photosensitive drum and the virtual intermediate transfer belt in the simulation in accordance with control information for the image forming unit which is supplied from the software simulation unit 101. The device driving calculating unit 321 calculates and stores virtual image position information from the rotational speeds of the virtual drum and virtual intermediate transfer belt, their positional relationship, parameters for a virtual register, operation timings, and the like.

The sheet position display unit 330 outputs the sheet position information (information concerning a leading edge position and trailing edge position) calculated by the sheet position calculating unit 320 through the output I/F unit 325, and gives an instruction to the display control unit 105 to display a sheet conveyance simulation window.

The output I/F unit 325 inputs various kinds of sensor information, device control information, and information concerning sheet conveyance, which are calculated by the device driving calculating unit 321 and the sheet position calculating unit 320, to the input I/F unit 312 of the software simulation unit 101. The output I/F unit 325 also inputs instruction information output from the sheet position display unit 330 to the display control unit 105.

Figure 2A:
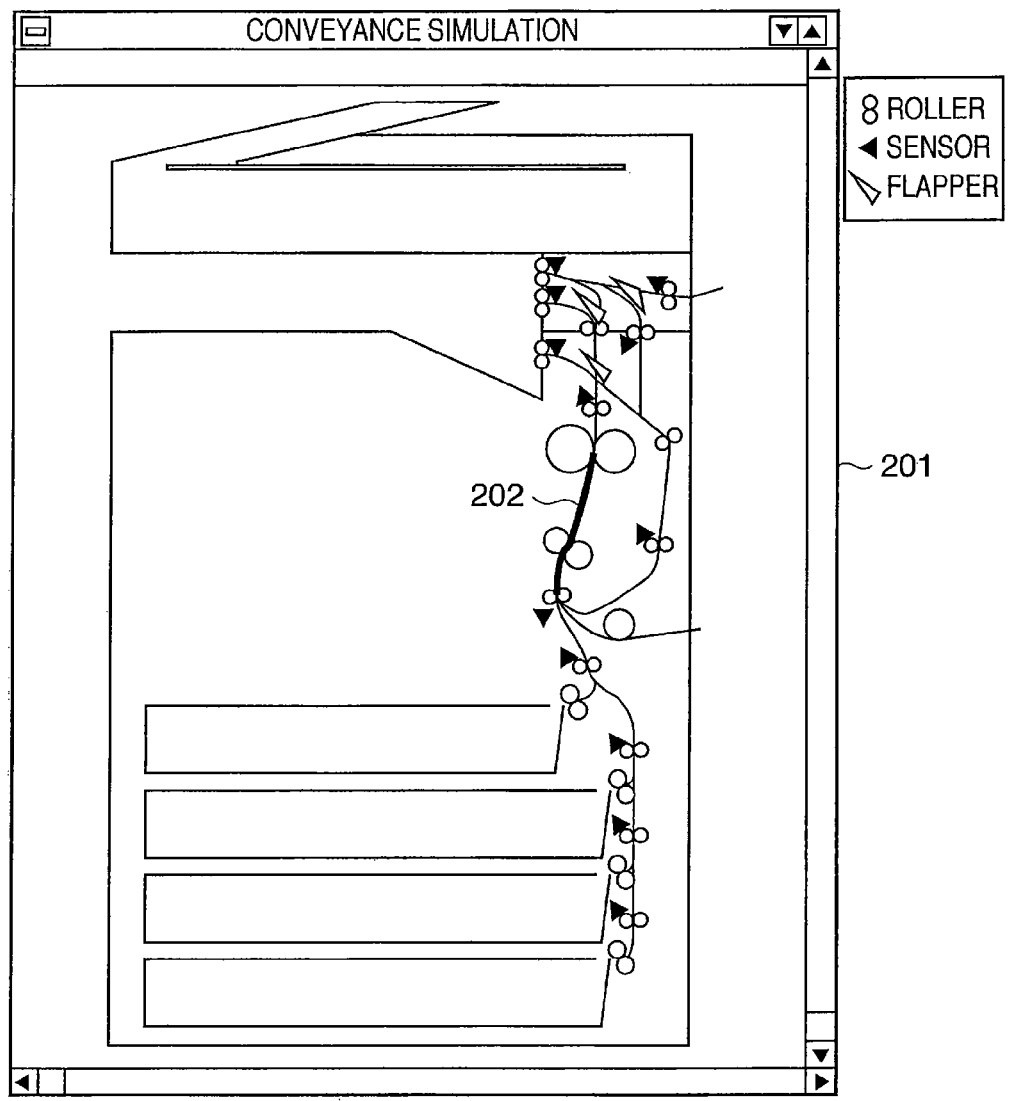
FIG. 2A is a view showing the result of a sheet conveyance simulation displayed on a display 108 under the control of a display control unit 105.

FIG. 2A is a view showing the sheet conveyance simulation result to be displayed on the display 108 under the control of the display control unit 105. In a sheet conveyance simulation window 201, the dotted lines represent sheet conveyance paths, the white circles represent conveyance rollers, the black triangles represent sensors, the white triangles represent flappers, and a solid line 202 represents a sheet.

If the verification result on the setting of a timing for controlling a control target and the state change of the control target falls outside an allowable range, the display control unit 105 causes the display 108 to display an abnormal portion of the control software.

The display control unit 105 can display an indication for notifying an abnormality in the sheet conveyance simulation window 201 or another window which can be collated with the sheet conveyance simulation window 201.

(Arrangement of Image Forming Apparatus)

The arrangement of the actual image forming apparatus controlled by the control software will be described next. The software simulation unit 101 and mechanism simulation unit 102 in the design support apparatus verify operation control on the virtual devices constituting the modeled image forming apparatus.

Figure 9:
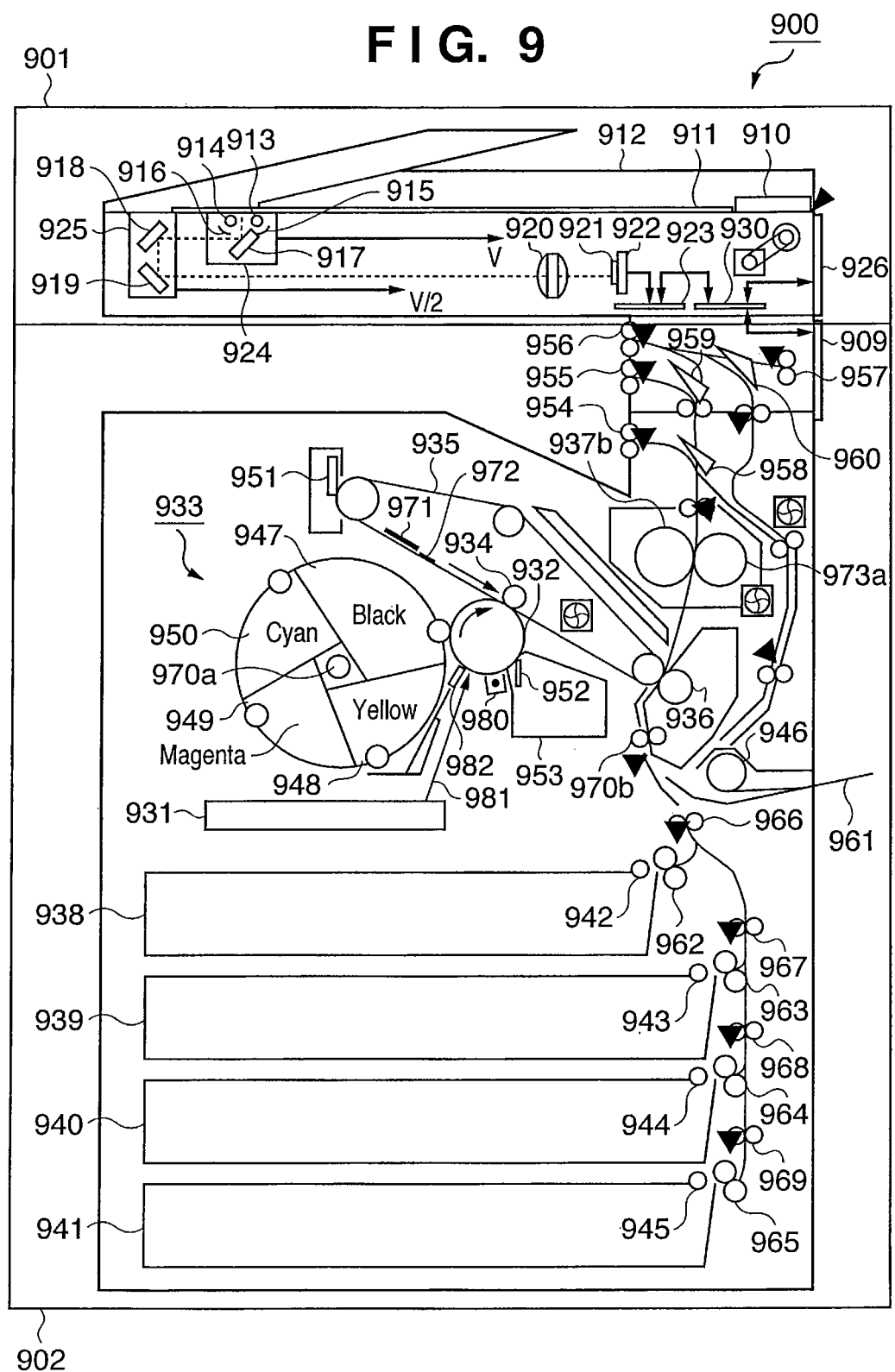
FIG. 9 is a sectional view showing the schematic arrangement of a color image forming apparatus.

FIG. 9 is a sectional view showing the schematic arrangement of a color image forming apparatus 900.

Reference numeral 901 denotes a color image reader unit (to be referred to as a "reader unit" hereinafter); and 902, a color image printer unit (to be referred to as a "printer unit" hereinafter).

(Arrangement of Reader Unit 901)

Reference numeral 910 denotes a control unit which controls the overall image forming apparatus; 911, an original plate (platen); and 912, an automatic document feeder (ADF). Reference numerals 913 and 914 denote light sources which illuminate a document. As these light sources, devices such as a halogen lamp, a fluorescent lamp, and a xenon lamp can be used. Reference numerals 915 and 916 denote reflectors, which focus light from the light sources 913 and 914 onto a document.

Reference numerals 917 to 919 denote mirrors; 920, a lens; and 921, a charge coupled device image sensor (to be referred to as "CCD" hereinafter). The lens 920 focuses reflected light or projected light from the document onto the CCD 921. The CCD 921 is mounted on a substrate 922. Reference numeral 923 denotes a digital image processing unit.

Reference numeral 924 denotes a carriage which houses the light sources 913 and 914, the reflectors 915 and 916, and the mirror 917; and 925, a carriage which houses the mirrors 918 and 919. The carriages 924 and 925 mechanically move at velocities V and V/2, respectively, in a sub-scanning direction Y perpendicular to the electric scanning direction (main scanning direction X) of the CCD 921, thereby scanning the entire surface of the document.

(Arrangement of Digital Image Processing Unit 923)

Figure 8:
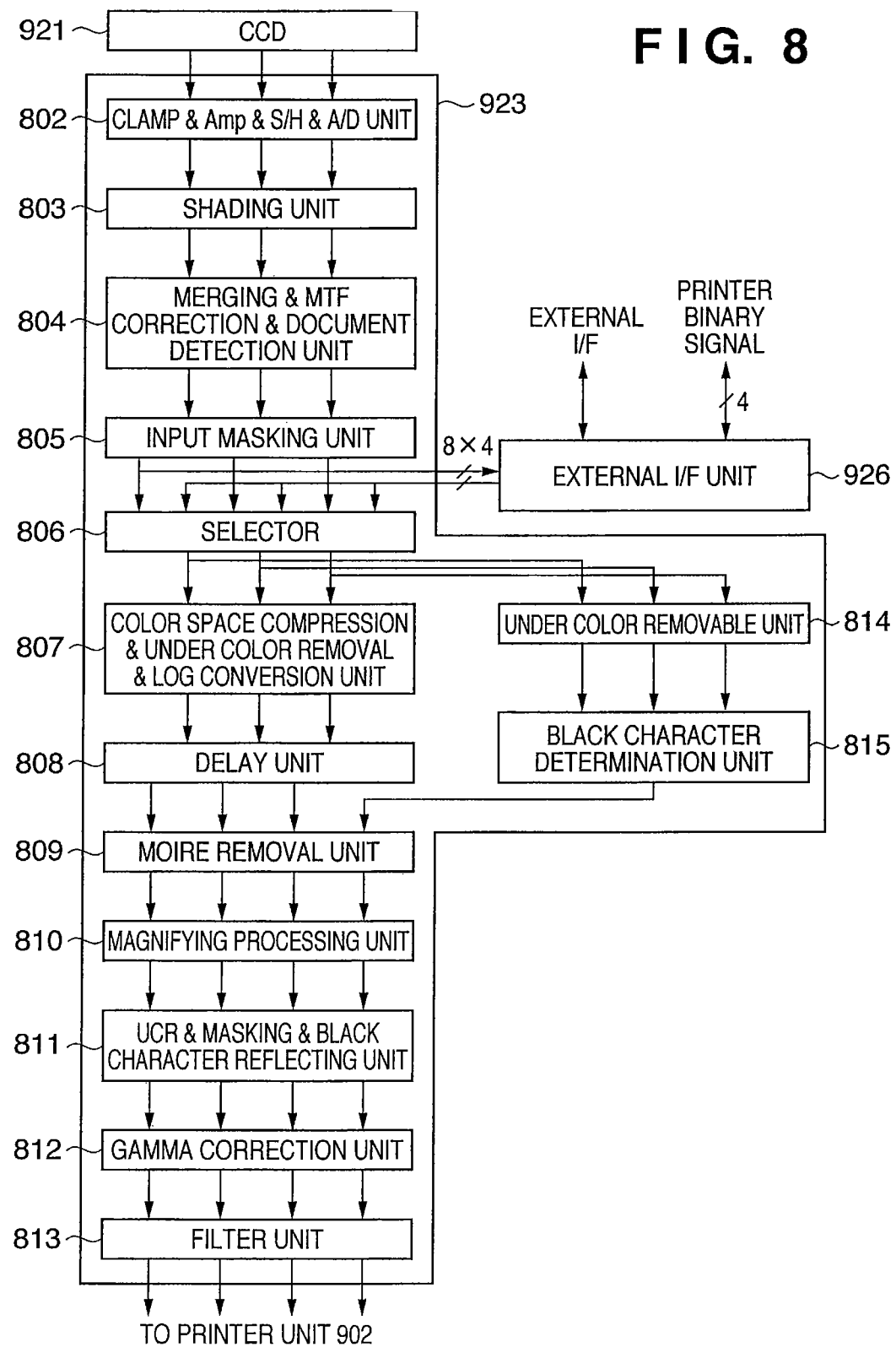
FIG. 8 is a block diagram showing the detailed arrangement of the digital image processing unit.

FIG. 8 is a block diagram showing the detailed arrangement of the digital image processing unit 923. Reference numeral 802 denotes a clamp & Amp & S/H & A/D unit; 803, a shading unit; 804, a merging & MTF correction & document detection unit; 805, an input masking unit; 806, a selector; 807, a color space compression & under color removal & LOG conversion unit; 808, a delay unit; 809, moire removal unit; 810, a magnifying processing unit; 811, a UCR & masking & black character reflecting unit; 812, a gamma correction unit; 813, a filter unit; 814, an under color removable unit; and 815, a black character determination unit.

A document on the original plate 911 reflects light from the light sources 913 and 914. The reflected light is guided to the CCD 921 to be converted into an electrical signal.

The digital image processing unit 923 receives the electrical signal (analog image signal). The clamp & Amp & S/H & A/D unit 802 samples/holds (S/H) the signal. The clamp & Amp & S/H & A/D unit 802 clamps the dark level of the analog image signal to a reference potential, amplifies the signal to a predetermined amount, and A/D-converts the signal into, for example, a digital signal comprising R, G, and B components each consisting of eight bits.

The shading unit 803 performs shading correction and black correction for the RGB signal. When the CCD 921 is a 3-line CCD, different read positions are set for the respective lines. In this case, therefore, the merging & MTF correction & document detection unit 804 performs merging processing to adjust the delay amounts of the respective lines in accordance with a read speed. The merging & MTF correction & document detection unit 804 then corrects the signal timings so as to match the read positions for the three lines.

The MTF for reading changes depending on the read speed or magnification. MTF correction is therefore performed to correct the change. Document detection is performed to recognize the size of the document by scanning the document on the original plate 911.

For the digital signal having undergone read position timing correction, the input masking unit 805 corrects the spectral characteristic of the CCD 921 and the spectral characteristics of the light sources 913 and 914 and reflectors 915 and 916.

The output from the input masking unit 805 is input to the selector 806 which can switch between itself and an external I/F signal. The color space compression & under color removal & LOG conversion unit 807 and the under color removable unit 814 receive the signal output from the selector 806.

The signal input to the under color removable unit 814 is subjected to under color removal processing. The resultant signal is input to the black character determination unit 815 which determines whether the signal represents a black character in the text on the document. The black character determination unit 815 then generates a black character signal.

The color space compression & under color removal & LOG conversion unit 807, which has received the output from the selector 806, determines whether the read image signal having undergone color space compression falls within the range in which color reproduction can be done by the printer. If the signal falls within the reproduction range, the signal is kept unchanged. If the signal falls outside the range, the color space compression & under color removal & LOG conversion unit 807 corrects the image signal to make the signal fall within the range in which color reproduction can be done by the printer. After under color removal processing, the LOG conversion unit converts the RGB signal into a YMC signal.

In order to correct the timing of the signal generated by the black character determination unit 815, the delay unit 808 adjusts the timing of the output signal from the color space compression & under color removal & LOG conversion unit 807.

The moire removal unit 809 removes moire from these two types of signals, and the magnifying processing unit 810 performs magnifying processing for the resultant signals in the main scanning direction.

The UCR & masking & black character reflecting unit 811 performs UCR processing for the signal processed by the magnifying processing unit 810 to generate a YMCK signal. The masking processing unit corrects the signal in accordance with an output from the printer, and the determination signal generated by the black character determination unit 815 is fed back.

The gamma correction unit 812 performs density adjustment for the signal processed by the UCR & masking & black character reflecting unit 811. The filter unit 813 then performs smoothing or edge processing for the signal, and outputs the resultant signal to the printer unit 902.

Figure 7:
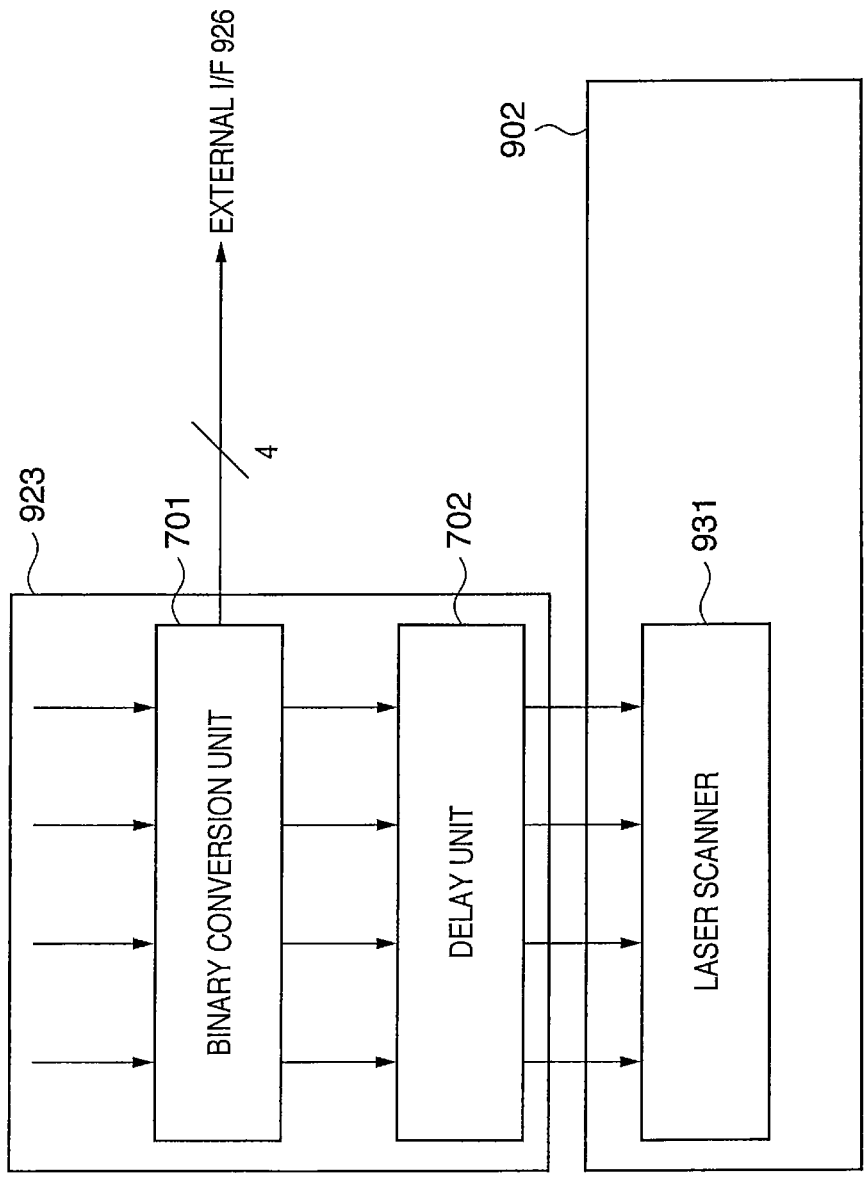
FIG. 7 is a block diagram showing the detailed arrangement of a digital image processing unit.

The digital image processing unit 923 can also comprise a binary conversion unit 701 and a delay unit 702 as shown in FIG. 7 in addition to the units ranging from the clamp & Amp & S/H & A/D unit 802 to the black character determination unit 815 shown in FIG. 8.

Referring to FIG. 7, the binary conversion unit 701 converts the 8-bit multilevel signal into a binary signal. As this conversion method, one of the following methods may be used: the dither method, error diffusion method, their improved methods, and the like. The binary signal obtained by conversion is transmitted to an external interface (I/F) 926 for another device and the delay unit 702. In this case, the external I/F 926 can transmit the received signal to an external output device such as a FAX machine (not shown), as needed.

The delay unit 702 transmits a control signal for adjusting the timing of transmission to a laser scanner 931 to the laser scanner 931 so as to correct the received signal and the laser emission timing of the laser scanner 931.

In this embodiment, the digital image processing unit 923 includes the binary conversion unit 701 and the delay unit 702. However, the present invention is not limited to this arrangement. The printer unit 902 may include the binary conversion unit 701 and the delay unit 702.

(Arrangement of Control Unit 910)

Figure 6:
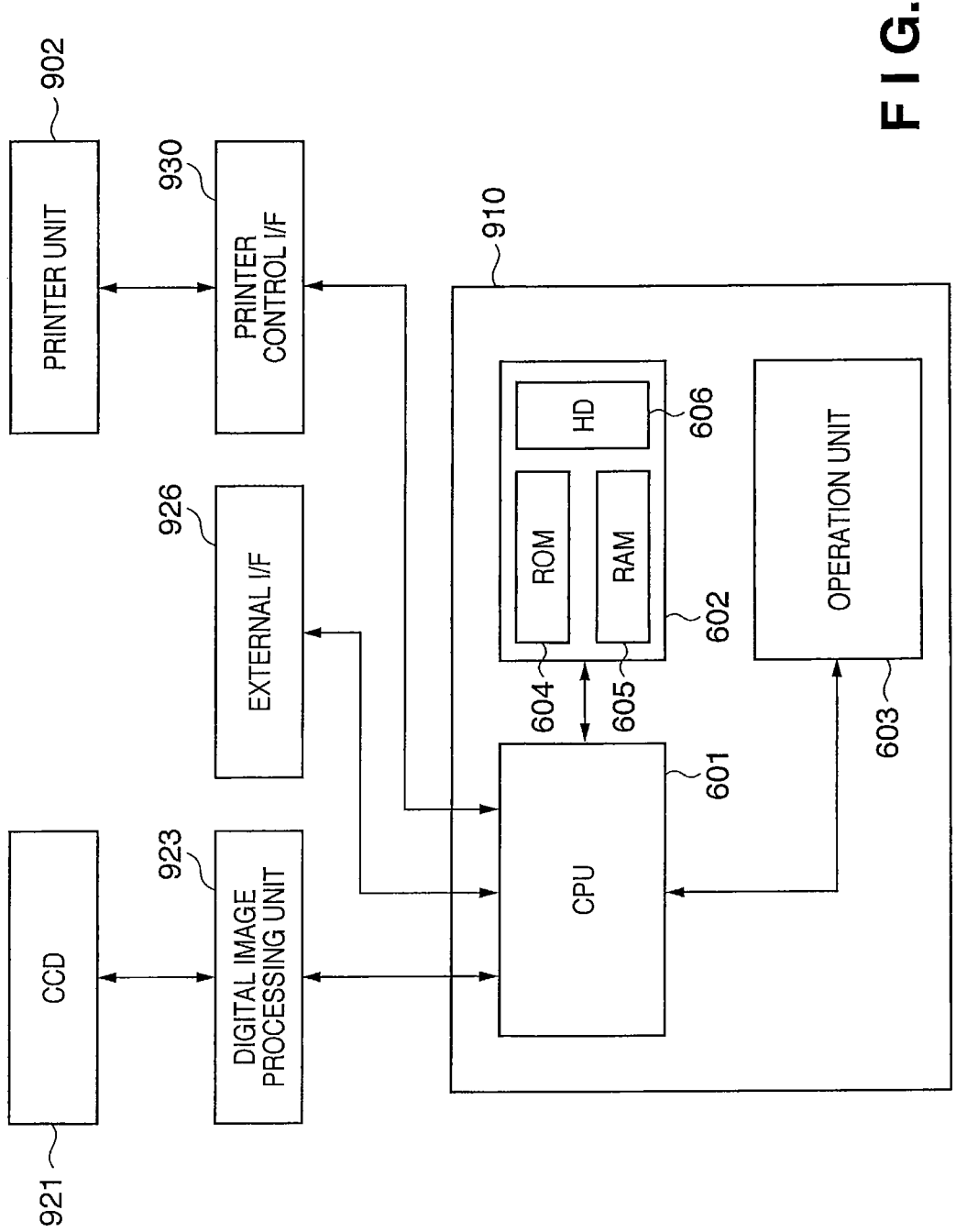
FIG. 6 is a block diagram for explaining the arrangement of a control unit.

FIG. 6 is a block diagram for explaining the arrangement of the control unit 910.

Reference numeral 930 denotes a printer control I/F; 601, a CPU; 602, a storage device; 603, an operation unit; 604, a ROM; 605, a RAM; and 606, a hard disk (HD).

The control unit 910 comprises the CPU 601 which exchanges information for control with the digital image processing unit 923, printer control I/F 930, and external I/F 926, the operation unit 603, and the storage device 602.

The storage device 602 comprises the RAM 605 which provides a work area for the CPU 601 and the ROM 604 which stores control programs for the CPU 601. The storage device 602 has the hard disk (HD) 606 which stores trigger information as information for switching device control operations and registration information concerning the allowable ranges of state changes with respect to device control operations switched by trigger information. The operation unit 603 comprises a liquid crystal display with a touch panel which the operator uses to input the contents of processing to be executed, and is used to notify the operator of information concerning processing, warnings, and the like.

(Arrangement of Printer Unit 902)

The arrangement of the printer unit 902 will be described next. Reference numeral 931 denotes a laser scanner serving as a latent image forming unit; 932, a photosensitive drum; 980, a charger; 982, a potential sensor; and 933, a rotating color developing device comprising a developing device and a developing device switching unit. The laser scanner 931, photosensitive drum 932, and rotating color developing device 933 constitute an image forming unit.

Reference numeral 934 denotes a primary transfer roller; 935, an intermediate transfer member; 936, a secondary transfer roller; 937b, a pressure roller; 938, 939, 940, and 941, cassettes; 942, 943, 944, and 945, pickup rollers; 946, a manual paper feed roller; 947, 948, 949, and 950, developing devices; 951, a cleaning blade which removes toner from the intermediate transfer member 935; 952, a cleaning blade which removes toner from the photosensitive drum 932; and 953, a waste toner box.

Reference numeral 954 denotes first delivery rollers; 955, second delivery rollers: 956, reversal rollers; 957, third delivery rollers; 958, first delivery flapper; 959, a second delivery flapper; 960, a third delivery flapper; and 961, a manual insertion sheet tray.

Reference numerals 962, 963, 964, and 965 denote feed rollers; 966, 967, 968, and 969, vertical path conveyance rollers; 970b, registration rollers; 971, a home position (to be referred to as "HP" hereinafter) sensor; and 972, an HP seal.

The printer control I/F 930 receives a control signal from the CPU 601 of the control unit 910. The printer unit 902 operates on the basis of the control signal from the printer control I/F 930.

Figure 5:
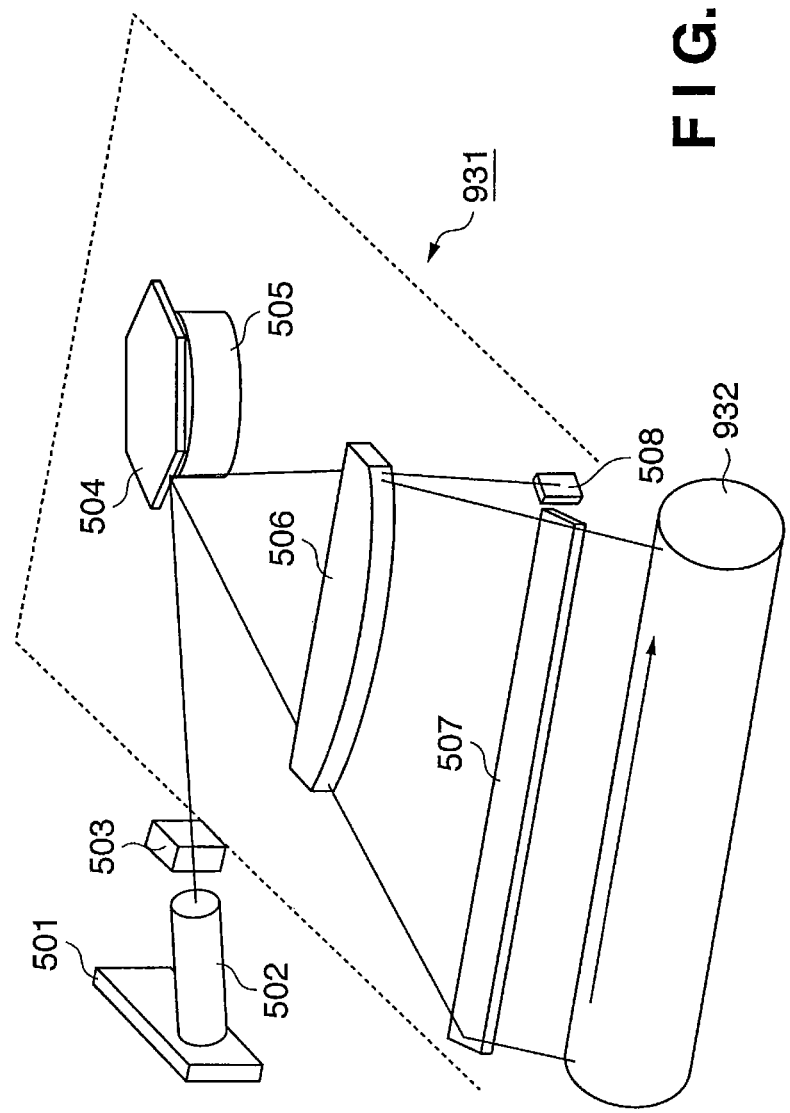
FIG. 5 is a view showing the schematic arrangement of a laser scanner.

FIG. 5 is a view showing the schematic arrangement of the laser scanner 931.

Reference numeral 501 denotes a laser driver circuit board; 502, a collimator lens; 503, a cylindrical lens; 504, a polygon mirror; 505, a polygon mirror driving motor; 506, an image formation lens; 507, a reflecting mirror; and 508, a beam detection (BD) circuit board.

The laser driver circuit board 501 performs control to emit a laser beam corresponding to an image data signal. The laser beam converted into parallel light by the collimator lens 502 and the cylindrical lens 503 strikes the polygon mirror 504 which is rotated by the polygon mirror driving motor 505 at a constant velocity.

The laser beam reflected by the polygon mirror 504 scans in the main scanning direction and strikes the photosensitive drum 932 through the image formation lens 506 and reflecting mirror 507 which are arranged in front of the polygon mirror 504.

A charger 980 has uniformly charged the surface of the photosensitive drum 932 in advance. The photosensitive drum 932 rotates clockwise. The laser scanner 931 then forms a color-separated electrostatic latent image on the photosensitive drum 932 in correspondence with an image exposure pattern.

In this embodiment, the diameter of the photosensitive drum 932 is set to, for example, 130 mm, and the rotational speed in the arrow direction is set to 135 mm/sec. The charger 980 charges the surface of the photosensitive drum 932 to, for example, −300 V to −900 V. A potential sensor 982 serving as a surface potential detection unit monitors the surface potential of the photosensitive drum, thereby calculating a proper surface potential for the photosensitive drum.

The rotating color developing device 933 comprises the developing devices 947, 948, 949, and 950 which are arranged around a rotation axis 970a and correspond to black, yellow, magenta, and cyan, respectively.

In this embodiment, the developing devices 947 to 950 are detachable from the rotating color developing device 933, and are attached at the respective designated color positions.

The developing devices 947 to 950 each supply toner of an amount corresponding to the electric charge on the photosensitive drum 932 to develop an electrostatic latent image on the photosensitive drum 932.

When a toner image is formed on the photosensitive drum 932 and a black image is to be developed, only the developing device 947 corresponding to black is used. A stepping motor (not shown) rotates the rotating color developing device 933 to a position where the developing sleeve of the developing device 947 faces the photosensitive drum 932.

The developing device 947 applies, to the surface of the photosensitive drum 932, toner corresponding to the potential amount formed between the surface of the photosensitive drum 932 and the developing sleeve to which a developing bias is applied, thereby developing the electrostatic latent image on the surface of the photosensitive drum 932.

When a color image is to be formed, the developing devices 947 to 950 corresponding to colors to be developed rotate about the rotation axis 970a to develop electrostatic latent images on the surface of the photosensitive drum 932.

Rotating the photosensitive drum 932 clockwise primarily transfers the toner image formed on the photosensitive drum 932 onto the intermediate transfer member 935 which rotates counterclockwise.

One rotation of the intermediate transfer member 935 completes primary transfer onto the intermediate transfer member 935 when forming a black image. Four rotations of the intermediate transfer member 935 complete primary transfer when forming a full-color image.

When an image corresponding to a specific sheet size, e.g., A4 size or less, is to be formed on the intermediate transfer member 935, images corresponding to two image areas each having the specific sheet size can be formed on the intermediate transfer member 935.

Sheets are picked up from the respective cassettes (the upper cassette 938, lower cassette 939, third cassette 940, and fourth cassette 941) by the pickup rollers 942, 943, 944, and 945 for the respective cassettes. Sheets conveyed by the feed rollers 962, 963, 964, and 965 for the respective cassettes can be conveyed to the registration rollers 970b by the vertical path conveyance rollers 966, 967, 968, and 969.

In the manual paper feed mode, a sheet stacked on the manual insertion sheet tray 961 is conveyed to the registration rollers 970b by the manual paper feed roller 946.

At the timing of completion of transfer onto the intermediate transfer member 935, the sheet is conveyed to between the intermediate transfer member 935 and the secondary transfer roller 936.

The sheet then is conveyed toward the fixing device while being sandwiched between the secondary transfer roller 936 and the intermediate transfer member 935 and is pressurized to secondarily transfer the toner image on the intermediate transfer member 935 onto the sheet.

A fixing roller 973a and the pressure roller 937b heat and pressurize the toner image transferred on the sheet to fix the image on the sheet.

The cleaning blade 951, which can come into contact with and separate from the intermediate transfer member 935, comes into contact with the intermediate transfer member 935 to clean the surface of the intermediate transfer member 935 by scraping transfer residual toner off the surface of the intermediate transfer member 935.

The cleaning blade 952 scrapes residual toner off the photosensitive drum 932. The toner is then transferred to the waste toner box 953 integrated with the photosensitive drum.

In the first sheet delivery mode, the first delivery flapper 958 is switched to the direction of the first delivery rollers 954 to deliver the sheet on which the toner image is fixed toward the first delivery rollers 954.

In the second sheet delivery mode, the first and second delivery flappers 958 and 959 are switched to the direction of the second delivery roller 955 to deliver the sheet toward the second delivery roller 955.

In the third sheet delivery mode, in order to temporarily perform reversing operation by using the reversal rollers 956, the first and second delivery flappers 958 and 959 are switched to the direction of the reversal roller 956 to cause the reversal rollers 956 to reverse the conveyance direction of the sheet.

In the double-sided printing mode, as in the third sheet delivery mode, reversing operation is temporarily performed by using the reversal rollers 956, and the third delivery flapper 960 is switched to the direction of a double-sided unit to convey the sheet to the double-sided unit. The apparatus temporarily stops conveying the sheet a predetermined time after a sensor detects the sheet, and resumes conveying the sheet as soon as preparation for image formation is complete again, thus executing image formation on the second surface.

(Sheet Conveyance Simulation)

A simulation on sheet conveyance control on the image forming apparatus by the design support apparatus according to this embodiment will be described next. Assume that the software simulation unit 101 causes control software for controlling a sheet conveyance mechanism and the like in a virtually modeled printer unit forming an image forming apparatus to virtually operate on a PC. The verification of control software exemplifies conveyance control on a sheet as a control target. Obviously, however, the gist of the present invention is not limited to this, and the present invention can also be applied to control on the driving timings of the photosensitive drum 932 and intermediate transfer member 935 constituting the image forming apparatus.

Figure 4:
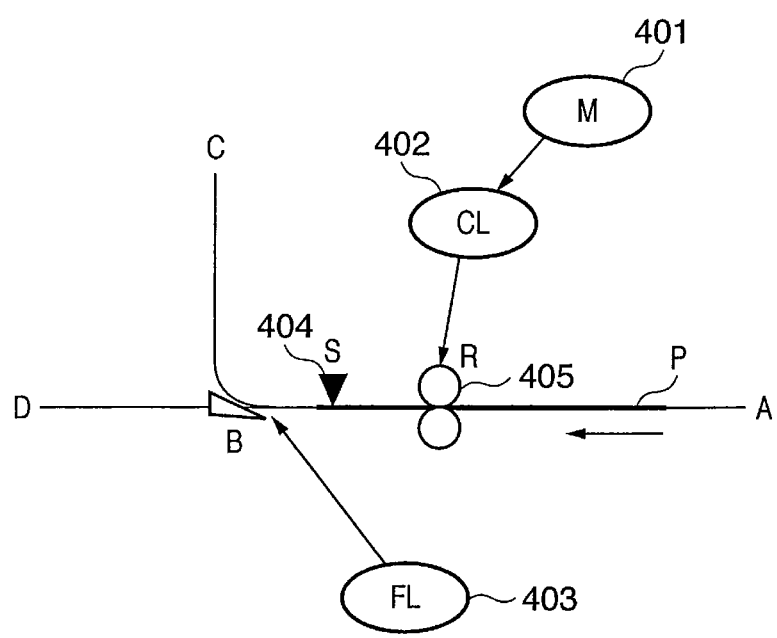
FIG. 4 is a view showing an example of the layout of various kinds of devices constituting a sheet conveyance mechanism associated with sheet conveyance control.

FIG. 4 is a view showing an example of the layout of various kinds of devices constituting a sheet conveyance mechanism associated with sheet conveyance control. Rollers R 405 convey a sheet P in the solid arrow direction on a path AB. A motor M 401 drives the rollers R 405 through a clutch CL 402.

A sensor S 404 detects the sheet P. A flapper FL 403 is switched at the timing when the leading edge of the sheet P passes through the sensor S 404. Switching the flapper FL 403 makes it possible to switch the conveyance path to a conveyance path BC or BD.

When the designer issues an instruction to start sheet conveyance simulation with the keyboard 106, mouse 107, or the like, the OS 103 activates the software simulation unit 101 and the mechanism simulation unit 102 through the input monitoring unit 104.

When the software simulation unit 101 starts, the control software unit 310, wrapper unit 311, and OS 103 cooperate to sequentially execute control software for performing sheet conveyance control on the image forming apparatus in real world.

When starting the processing of starting rotating the motor M 401, the wrapper unit 311 and the control software unit 310 output, as a command, an ID number specifying the motor M 401, a rotational speed, and a rotating direction through the output I/F unit 313. The input I/F unit 324 of the mechanism simulation unit 102 receives the command output from the output I/F unit 313. The device driving calculating unit 321 then receives the command.

The device driving calculating unit 321 determines that the command is a command to drive the motor M 401, and starts rotational driving calculation for the motor M 401. The device driving calculating unit 321 then determines from information concerning the motor M 401 and clutch CL 402 which connect to the rollers R 405 whether to rotate the rollers R 405. At this point of time, since the motors M 401 are rotating and the clutch CL 402 is in the initial state, the device driving calculating unit 321 determines not to rotate the rollers R 405.

When starting control on the clutch CL 402, the wrapper unit 311 and control software unit 310 output, as a command, an ID number specifying the clutch CL 402 and an ON/OFF state through the output I/F unit 313. The input I/F unit 324 of the mechanism simulation unit 102 receives the command output from the output I/F unit 313. The device driving calculating unit 321 then receives the command.

The device driving calculating unit 321 analyzes the command and determines that the command is for the clutch CL 402, and switches the clutch CL 402 from the OFF state to the ON state. Since the motor M 401 is rotating and the clutch CL 402 is in the ON state, the device driving calculating unit 321 rotates the rollers R 405 at the rotational speed and in rotating direction which are based on the driving command for the motor M 401.

The sheet position calculating unit 320 computes the positions of the leading and trailing edges of the sheet P at predetermined time intervals t. First of all, the sheet position calculating unit 320 reads out the path information of the path AB including the interval between the leading edge and the trailing edge of the sheet P. The path information held by the sheet position calculating unit 320 includes the IDs of rollers in each path and corresponding position information.

The sheet position calculating unit 320 searches for rollers in the interval between the leading edge position to the trailing edge position of the sheet P, and inquires the device driving calculating unit 321 of a velocity v of the rollers R 405 by using the ID of the first rollers R405 on the basis of the search result. The sheet position calculating unit 320 obtains, as the position of the sheet P, distance S=v×t that the sheet P has moved in the time interval t on the basis of the velocity v and the time interval t which are obtained from the device driving calculating unit 321. The sheet position display unit 330 receives the updated position information of the sheet P. The sheet position display unit 330 outputs the position information of the sheet, which is calculated by the sheet position calculating unit 320, through the output I/F unit 325, and instructs the display control unit 105 to display the sheet conveyance simulation window 201.

The path information held by the sheet position calculating unit 320 includes the IDs of sensors in each modeled path and position information. The sheet position calculating unit 320 searches for a sensor from the leading edge position of the sheet P to the trailing edge, and transfers ON information for turning on the output of the sensor S 404 to the output I/F unit 325. In a state wherein the trailing edge of the sheet P has passed through the sensor S 404, the sheet position calculating unit 320 transfers OFF information for turning off the output of the sensor S 404 to the output I/F unit 325.

The output I/F unit 325 outputs the ON information of the sensor S 404 as a command to the input I/F unit 312 of the software simulation unit 101.

The control software unit 310 receives the ON information of the sensor S 404 from the input I/F unit 312, and starts controlling the flapper FL 403. The transmission of a command to the mechanism simulation unit 102 is almost the same as that in the case of the motor M 401 and clutch CL 402.

At the start of control on the flapper FL 403, an ID number specifying the flapper FL 403 and a rotating direction are output as a command through the output I/F unit 313. The input I/F unit 324 of the mechanism simulation unit 102 receives the command output from the output I/F unit 313. The device driving calculating unit 321 then receives this command.

Upon receiving the command for controlling the flapper FL 403, the device driving calculating unit 321 in the mechanism simulation unit 102 transfers switching information concerning the flapper with the corresponding ID to the sheet position calculating unit 320. The sheet position calculating unit 320 switches the direction of the flapper FL 403 corresponding to the ID on the basis of the flapper switching information. When the leading edge of the sheet P reaches a branch point B, the sheet position calculating unit 320 determines, in accordance with the switched state of the flapper FL 403, whether the path to which the sheet should advance is a path BC or a path BD. The path information of the corresponding path is changed on the basis of the determination result.

(Control Software Procedure)

A control software verification method in the design support apparatus according to the embodiment of the present invention will be described next. The following will exemplify the control timing for the sheet conveyance rollers and the high voltage control timing for the secondary transfer roller 936.

To verify the control timing for the sheet conveyance rollers is to verify whether the rotation control and stopping control of sheet conveyance rollers are performed at proper timings with respect to the conveyance position of a sheet conveyed on a conveyance path. To verify the high voltage control timing for the secondary transfer roller is to verify whether high voltage ON/OFF control for the transfer of a toner image on the intermediate transfer member 935 onto a sheet passing through the secondary transfer roller 936 is performed at a proper timing with respect to the conveyance position of the sheet.

Figure 10:
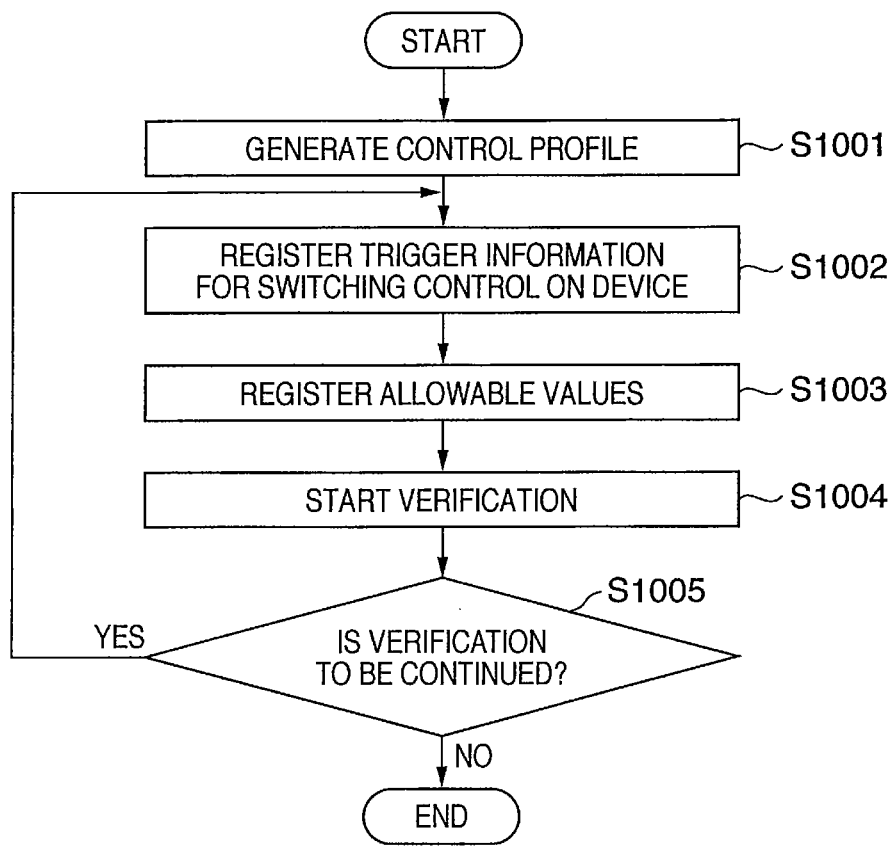
FIG. 10 is a flowchart for explaining a procedure for verifying control software by a design support apparatus according to this embodiment.
Figure 15A:
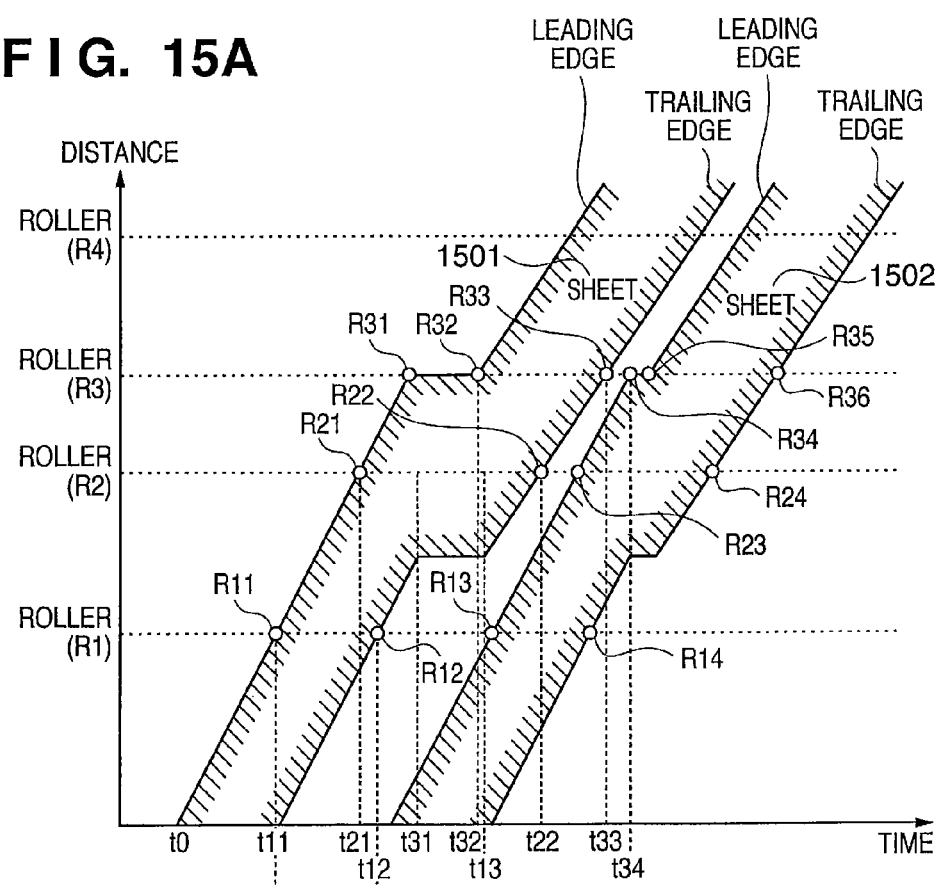
FIGS. 15A and 15B are graphs for explaining an example of conveyance control on a plurality of target conveyance members (sheets 1501 and 1502) as the prior art.
Figure 15B:
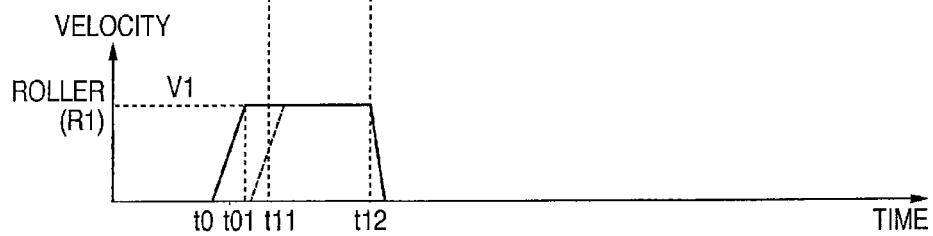

FIG. 10 is a flowchart for explaining a control software verification procedure by the design support apparatus according to this embodiment. First of all, in step S1001, this apparatus generates the control profiles of the conveyance rollers and secondary transfer roller. Each control profile includes information concerning a device as a control target, information concerning a control type (roller driving control, high voltage ON/OFF control, or the like) for the device, information concerning a control item for the device, and information concerning a set value corresponding to the control item.

FIG. 11 is an exemplary view showing the profiles of the rollers R1, R2, R3, and R4 as control targets. The rollers in FIGS. 11 and 9 have the following correspondence relationship: R1=vertical path conveyance rollers 967, R2=vertical path conveyance rollers 966, R3=registration rollers 970b, and R4=secondary transfer roller 936.

In each control profile, a control type such as roller control or high voltage control is designed for each control target, and a control item and a corresponding set value are registered. For example, with regard to driving control on the roller R1, when the roller is to be driven at one of two types of accelerations, a control item like "acceleration A" or "acceleration B" and a corresponding set value are registered. The generated control profile is used when the mechanism simulation unit 102 performs a simulation on the physical phenomenon from the instant the software simulation unit 101 issues an instruction to stop the roller to the instant the roller decelerates and completely stops.

In step S1002, the apparatus registers trigger information as information for switching control on each device. The designer can register trigger information through an input unit such as the keyboard 106 or the mouse 107. The hard disk (HD) 606 or RAM 605 of the storage device 602 stores the registered trigger information.

FIG. 12 is a view showing an example of the registration of trigger information for switching control on the rollers constituting the conveyance mechanism. Each trigger information can be selectively registered as a control trigger for actively controlling control on a device or a phenomenon trigger based on a relative relationship with a sheet, e.g., the entrance or withdrawal of the sheet.

A control trigger is written as the contents of control to be executed when start conditions for switching the control state of a device are satisfied. A phenomenon trigger is written as the relative positional relationship between devices as control targets (the rollers R2, R3, and R4 in the case in FIG. 12) and a sheet to be conveyed.

Note that both a control trigger and a phenomenon trigger are not essential registration items for the verification of control software, and it is possible to verify control software by registering only a control trigger depending on the target to be controlled.

Referring to FIG. 12, for example, a registration number T1 indicates a control trigger to cause control software to "start deceleration control on the roller R3" after satisfaction of the start condition "after the trailing edge of the third sheet leaves the roller R3 as a control target".

The control trigger corresponding to the registration number T1 is detected at the timing when the device driving calculating unit 321 receives a command indicating the start of deceleration control on the roller R3 by the control software unit 310 through the output I/F unit 313 and the input I/F unit 324.

A registration number T2 indicates a control trigger to cause the control software to "start deceleration control on the roller R3 to physically complete deceleration" after satisfaction of the start condition "after the trailing edge of the third sheet leaves the roller R3 as a control target".

Upon receiving the command input indicating the start of deceleration control on the roller R3, the device driving calculating unit 321 computes rotational driving for the roller R3 on the basis of profile information (#8) in FIG. 11. The device driving calculating unit 321 then detects the timing of the transition of the rotational speed of the roller R3 from a deceleration state to a stopping state as the timing of the completion of deceleration corresponding to the registration number T2.

A registration number T3 means "the timing when the leading edge of the fourth sheet has struck the roller R3" as a phenomenon trigger.

The phenomenon trigger corresponding to the registration number T3 is detected at the timing when the device driving calculating unit 321 receives information indicating that the leading edge position of the fourth sheet, which is calculated by the sheet position calculating unit 320, reaches the position of the roller R3.

It is possible to use a GUI (Graphical User Interface) for easily setting the respective items when registering the triggers shown in FIG. 12. Designing a "trigger selection" item 1201 in a pull-down form makes it possible to register either "control" or "phenomenon" as a trigger. It is also possible to perform display control such that when either of the triggers is selected by trigger selection, for example, "control" (trigger) is selected, the "phenomenon" (trigger) entry field is grayed out to inhibit input operation. With regard to the respective detailed items of state changes corresponding to "control" and "phenomenon", it is possible to set the respective detailed items ("number of times", "control target", "type", "phenomenon", "control", and the like) in the pull-down form. Allowing to select and set items in the pull-down form makes it possible to efficiently perform registering operation.

Note that in the registration of triggers in FIG. 12, control targets are not limited to rollers. For example, it is possible to register state changes concerning the intermediate transfer member 935, photosensitive drum 932, and the like. Registering triggers concerning the intermediate transfer member 935, photosensitive drum 932, and the like as control target devices can verify the driving timings and the like of the intermediate transfer member 935 and photosensitive drum 932.

Referring back to FIG. 10, in step S1003, this apparatus registers the allowable range (the minimum allowable value (Min) and maximum allowable value (Max)) of state changes concerning control on a device which is switched by trigger information. The designer can register the allowable range of state changes through an input unit such as the keyboard 106 or the mouse 107. The hard disk (HD) 606 or RAM 605 of the storage device 602 stores the registered allowable range of state changes.

FIG. 13 is a view showing an example of the setting of allowable ranges of state changes.

Assume that this apparatus starts decelerating the conveyance roller R3, completes the deceleration (temporary stop), and verifies the timing when the leading edge of a sheet strikes the conveyance roller R3. In this case, the apparatus registers the registration numbers T1 and T3 in FIG. 12, as indicated by reference numerals 1302 and 1303 in FIG. 13.

Specific values defining a difference "(T3)−(T1)" as an allowable range are registered in the minimum value (Min) and maximum value (Max) entry fields. A minimum value Min 1304 and a maximum value Max 1305 are set values determined in consideration of the time (corresponding to T2−T1) required to decelerate the roller R3 to completely stop it from the start of deceleration of the roller R3.

Reference numeral 1306 in FIG. 13 denotes a setting for verifying the timing when the roller R3 (corresponding to the registration rollers 970b in FIG. 9) physically and completely stops before the leading edge of a sheet strikes the roller R3.

Reference numeral 1307 in FIG. 13 denotes a setting for verifying the timing when the roller R2 (corresponding to the vertical path conveyance rollers 966 in FIG. 9) starts accelerating before the leading edge of the sheet strikes the roller R2. In this case, "n" in the item "number of times" corresponding to each of registration numbers T4 and T5 represents an (arbitrary number)th sheet to be conveyed, and "n+1" in the item "number of times" corresponding to a registration number T6 represents an (arbitrary number+1)th sheet. The setting field 1307 and a setting field 1308 in FIG. 13 represent settings for verifying the timing of a state change between the (arbitrary number)th sheet (n) and the (arbitrary number (n)+1)th sheet.

Let T4 be the point of time at which the roller R2 starts accelerating after the trailing edge of the (arbitrary number (n))th sheet leaves the roller R2, and T6 be the point of time at which the leading edge of the (n+1)th sheet strikes the roller R2. If a timing difference (T6)−(T4) falls within the allowable range, the timing of the state change ((T6)−(T4)) is determined normal.

Reference numeral 1308 in FIG. 13 denotes a setting for verifying the timing when the roller R2 (corresponding to the vertical path conveyance rollers 966 in FIG. 9) finishes accelerating and is set in a constant velocity state before the leading edge of the sheet strikes the roller R2.

With regard to the setting corresponding to the registration number T4, assume that even if control operations other than acceleration control, e.g., deceleration control, are performed on the roller R2 before the trailing edge of the nth sheet leaves the roller R2 and acceleration control is started, the control operations are neglected at the time of determination of conditions.

Reference numerals 1309 and 1310 denote settings for verifying whether high voltage control on the roller R4 (the secondary transfer roller 936 in FIG. 9) starts turning off or completes turning off at a predetermined timing after the trailing edge of the (arbitrary number (n))th sheet leaves the roller R4.

Reference numerals 1311 and 1312 denote settings for verifying whether the roller R3 (the registration rollers 970b in FIG. 9) starts accelerating and completes accelerating at predetermined timings with respect to the (arbitrary number (n))th sheet whose leading edge has struck the roller R3. The settings denoted by reference numerals 1311 and 1312 allow to verify whether a loop amount for correcting skew has been sufficiently formed.

Referring back to FIG. 10, in step S1004, the apparatus starts verification. The CPU 601 refers to the input operation state of the device and the trigger information registered in the storage device 602 (the RAM 605 or the HD 606). The CPU 601 then verifies whether start conditions for a control trigger are satisfied, and the state change of the device due to switched control falls outside the allowable range.

In this case, it is possible to verify the operation state of the device, which is to be input, by using the simulation result obtained by the software simulation unit 101 or the like. Alternatively, it is possible to input, as data, the result obtained by causing control software to operate an actual image forming apparatus and use the data for verification without using any simulation result.

When the designer issues an instruction to start a sheet conveyance simulation with the keyboard 106, the mouse 107, or the like, the OS 103, software simulation unit 101, and mechanism simulation unit 102 start through the input monitoring unit 104. When the software simulation unit 101 starts, the control software unit 310, wrapper unit 311, and OS 103 cooperate to sequentially execute control software for performing sheet conveyance control on the image forming apparatus in real world. The input I/F unit 324 of the mechanism simulation unit 102 receives the simulation result from the output I/F unit 313. The device driving calculating unit 321 then receives the result.

The device driving calculating unit 321 determines whether the input result corresponds to any of the registered triggers (FIG. 12). If the result corresponds to a registered trigger, the device driving calculating unit 321 then determines whether the result matches the verification item of allowable values exemplarily shown in FIG. 13.

If the result matches the verification item of allowable values, it is determined whether the state change obtained on the basis of the calculation results obtained by the device driving calculating unit 321 and the sheet position calculating unit 320 falls within the allowable range (determined by minimum and maximum values).

If the state change obtained by calculation exceeds the allowable range, the device driving calculating unit 321 notifies the sheet position display unit 330 of the corresponding information through the sheet position calculating unit 320.

The sheet position display unit 330 instructs the display control unit 105 to change the display color of the corresponding control target in the sheet conveyance simulation window 201, thereby notifying the abnormal state. The sheet position display unit 330 also notifies the specific contents of the abnormal state which has occurred. The specific contents include the verification item of allowable values corresponding to the abnormal state, the set allowable values, and the timing of the state change which is obtained by calculation (see FIG. 2B).

FIG. 2B is an exemplary view showing an identification indication to be displayed when the verification result of "verifying the timing when the roller R3 (the registration rollers 970b in FIG. 9) physically and completely stops before the leading edge of the sheet strikes the roller R3" exceeds the allowable range. The calculated value of the state change by the simulation is 210, which falls outside the allowable range (allowable value Min=0 and allowable value Max=200), and hence the verification result is NG. Such an identification indication allows to specify a defective portion in device control which exceeds the allowable range. The designer can determine on the basis of the contents displayed on the display 108 whether there is any problem in terms of design, under the control of the display control unit 105. Correcting the control program to make the timing of the state change, which is obtained by calculation, fall within the allowable range makes it possible to cancel the abnormal state.

If it is determined in step S1005 in FIG. 10 that verification of the control program is to be continued, the process returns to step S1002 to newly register a trigger (FIG. 12) and set allowable values (FIG. 13). This makes it possible to repeatedly perform a verification. Making detailed trigger setting can execute a detailed verification on the control timing when control on a device is switched. In registration of triggers, it is possible to set triggers finely or coarsely in accordance with the control target to be verified.

In this embodiment, as the phenomenon triggers in FIG. 12, sheet positions are set in the form of relative positional relationships with rollers, like the timings when the leading edge of a sheet strikes rollers constituting the conveyance mechanism or the timings when the trailing edge of the sheet leaves the rollers. The setting of a phenomenon trigger is not limited to the relative positional relationship between a sheet and a roller. If, for example, the conveyance position of a sheet can be grasped in real time, it is possible to write, as a phenomenon trigger, the timing when the leading edge of the sheet reaches a predetermined position on a conveyance path.

The verification in this embodiment is not limited to a case wherein the verification is executed in real time in accordance with the execution of a simulation. It is possible to store the execution process of control software in advance and perform a verification after the execution of the control software on the basis of the stored information.

In addition, this embodiment can efficiently verify control software for controlling an apparatus.

Second Embodiment

The first embodiment has exemplified the verification on the control software focused on the conveyance mechanism of the image forming apparatus. In contrast, the second embodiment will exemplify, as a verification on an image forming unit, a verification on a control program for the formation of a full-color image on thick paper. FIG. 14A is a timing chart for a case wherein a full-color image is to be formed on thick paper.

Reference numeral 1401 denotes the velocity change timing of a DC brushless motor (not shown) which drives a photosensitive drum 932 and an intermediate transfer member 935; and 1402, a home position (HP) signal for determining an image formation timing. An HP sensor 971 outputs this signal every time it detects an HP seal 972 attached to the inside of the intermediate transfer member 935.

Reference numeral 1403 denotes the timing of the emission of a laser beam on the basis of image data. The emission of light starts a predetermined period of time after the HP signal 1402. In this case, Y (yellow), M (magenta), C (cyan), and K (black) images constituting a full-color image corresponding to A4 size are sequentially formed in the order named. Reference numeral 1404 denotes the timing of the primary transfer of a toner image formed on the photosensitive drum 932 onto the intermediate transfer member 935.

Reference numeral 1405 denotes the timing when a rotating color developing device 933 is rotated to make another developing device approach the photosensitive drum 932; and 1406, the timing when a charger 980 charges the surface of the photosensitive drum 932.

Reference numeral 1407 denotes the timing of the secondary transfer of a toner image transferred on the intermediate transfer member 935 onto the sheet. This timing is determined with reference to the HP signal 1402.

Reference numeral 1410 denotes a period from the formation of a latent image to secondary transfer; and 1450, a time from the input of an HP signal 1424 to secondary transfer 1460.

When forming an image on thick paper, an envelope, or a sheet such as an OHP sheet, the apparatus cannot sufficiently fix toner on the sheet at the same fixing speed as that for plain paper. It is therefore necessary to set a fixing speed lower than that for plain paper. In such a case, in an arrangement in which the same sheet is simultaneously conveyed to a fixing roller 973a, pressure roller 937b, and secondary transfer roller 936, it is necessary to decrease the rotational speed of the intermediate transfer member 935 in accordance with the fixing speed.

According to the timing chart of FIG. 14A, the rotational speed of the motor 1401 is reduced to ½ that of first transfer after the lapse of the time denoted by reference numeral 1440 since the completion of primary transfer of a K image of the final color of a full-color image. After the rotational speed of the motor 1401 is stabilized in a low speed state and the predetermined time 1450 elapses since the timing when the HP signal 1424 is detected again, the toner image on the intermediate transfer member 935 is secondarily transferred onto the sheet.

In this case, the apparatus determines the time 1450 from the instant the HP signal 1424 is detected to the instant the secondary transfer 1460 is started as a predetermined time regardless of the rotational speed of the motor 1401. For this reason, if the motor 1401 has not completed deceleration at a timing 1490, the toner image on the intermediate transfer member 935 advances too much with respect to the sheet conveyed to the secondary transfer roller 936. As a result, the leading edge position of the toner image deviates from the leading edge position of the sheet.

The timing of the emission of the laser beam 1403 will be described next, for example, in a case wherein a latent image of a magenta component (M) is formed at a timing 1491. In this case, a timing 1492 when a magenta developing device 949 is made to approach the photosensitive drum 932 is late, a rotational shock of the rotating color developing device 933 affects laser emission. For this reason, an undesirable stripe or the like is formed near the leading edge of the latent image of the magenta component. In addition, when the leading edge of the latent image of the magenta component reaches the developing sleeve of the magenta developing device 949, the start-up of the developing sleeve becomes later than the proper timing. As a consequence, the leading edge of the image may become light in color.

The design support apparatus according to this embodiment verifies a defect in control software which causes such a trouble. A control software verification procedure by the design support apparatus follows the flowchart of FIG. 10.

In step S1001, the apparatus generates control profiles. If, however, the apparatus is to perform a verification using an actual image forming apparatus, there is no need to generate the profiles of various kinds of motors, rollers, and the like. This is because the apparatus can acquire actually measured values without using any profile.

In step S1002, the apparatus registers triggers for switching device control operations. FIG. 16 is a view showing an example of the registration of control triggers for switching control operations for mechanical units constituting an image forming unit.

A registration number T161 indicates a control trigger to "start deceleration of a driving motor for the intermediate transfer member 935 (ITB)" after satisfaction of the start condition "after primary transfer of a black component (K) in an arbitrary item (n) is complete and turning off of primary transfer high voltage control is complete".

A registration number T163 indicates a control trigger to "identify that the HP sensor 971 has detected the HP seal 972" after satisfaction of the start condition "after primary transfer of a black component (K) in an arbitrary item (n) is complete and turning off of primary transfer high voltage control is complete".

A registration number T165 indicates a control trigger to "complete deceleration of the rotating color developing device 933 (DR)" after satisfaction of the start condition "after the formation of an electrostatic latent image of an yellow component (Y) in an arbitrary item (n) is complete and exposure by a laser diode (LD) is complete".

A registration number T166 indicates a control trigger to "start exposure by the LD to start forming an electrostatic latent image of the next color component" after satisfaction of the start condition "after the formation of an electrostatic latent image of an yellow component in an arbitrary item (n) is complete and exposure by the laser diode is complete".

In step S1003 in FIG. 10, allowable values for a state change are set with respect to device control switched by a trigger. FIG. 17 is a view showing an example of the setting of allowable values for state changes.

Reference numeral 1701 in FIG. 17 denotes a setting for verifying whether the driving motor for the intermediate transfer member 935 (ITB) has started deceleration (trigger T161) before detection of the HP signal 1424 (control trigger T163).

Reference numeral 1702 in FIG. 17 denotes a setting for verifying whether the driving motor for the intermediate transfer member 935 (ITB) has completed deceleration before detection of the HP signal 1424 (control trigger T163).

Reference numeral 1703 in FIG. 17 denotes a setting for verifying whether the rotating color developing device 933 has started accelerating (control trigger T164) before the start of exposure by the laser diode (control trigger T166).

Reference numeral 1704 in FIG. 17 denotes a setting for verifying whether the rotating color developing device 933 has completed accelerating (control trigger T165) before the start of exposure by the laser diode (control trigger T166).

After the completion of the registration of triggers (S1002) and the setting of allowable values (D1003), the apparatus starts a verification in step S1004. When the designer issues an instruction to start image formation with an operation unit 603, the apparatus starts image formation in accordance with the same procedure as that described with reference to the image forming apparatus in real world. During image formation, a CPU 601 sequentially stores, as log information in a RAM 605, ON/OFF control information concerning various kinds of loads, e.g., a motor, high voltage, and laser, and input information from sensors and the like. The apparatus transmits the log information stored in this case to a PC or the like connected through an external I/F 926. The log information includes information corresponding to each item in the control trigger list shown in FIG. 16 and time information corresponding to the occurrence of a state change by a control trigger.

Figure 18:
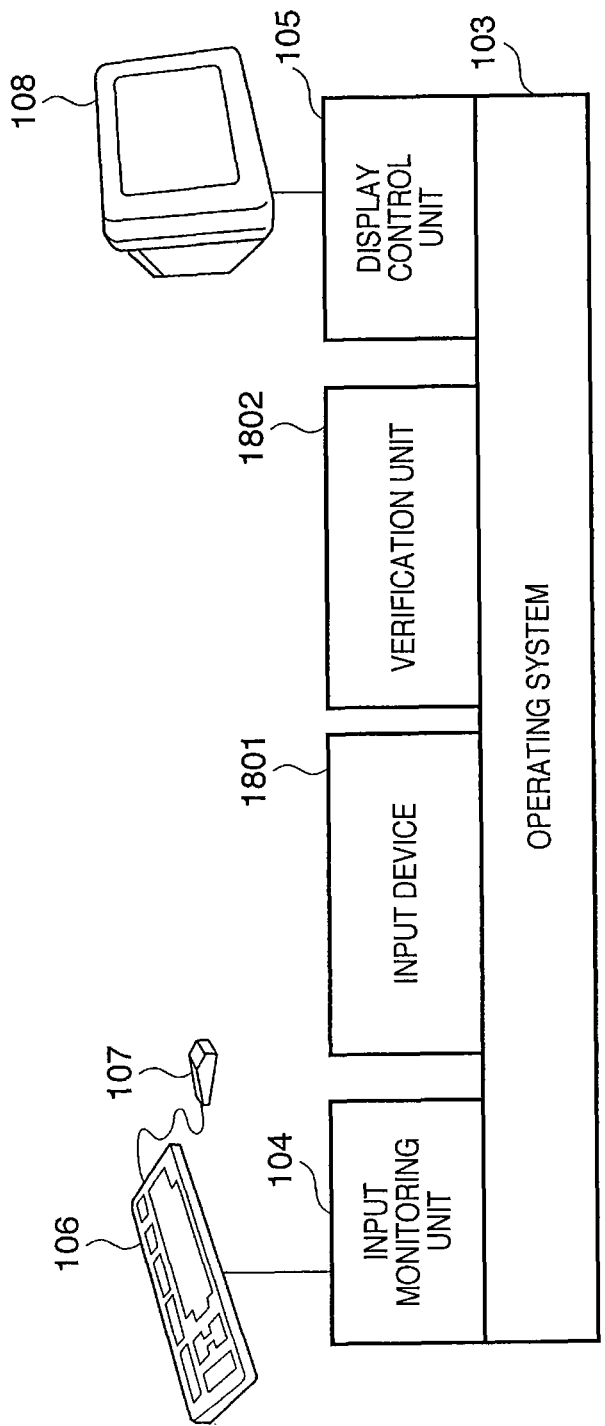
FIG. 18 is a block diagram showing the arrangement of a design support apparatus according to the second embodiment.

Upon completion of the image formation processing, the design support apparatus according to the second embodiment shown in FIG. 18 verifies control software. The same reference numerals as in the first embodiment denote the same constituent elements of the design support apparatus, and a repetitive description will be omitted.

An input device 1801 inputs the log information obtained from the image forming apparatus to the design support apparatus. In this case, this input device may be a device which inputs data through a storage medium such as a flexible disk or a device which inputs data by RS-232C or USB connection.

Figure 19:
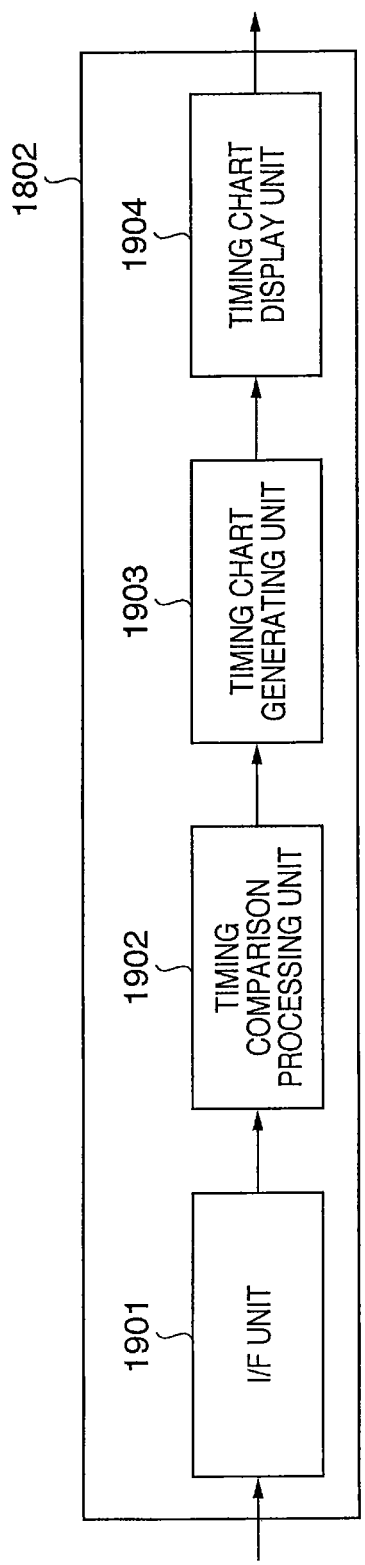
FIG. 19 is a block diagram showing the specific arrangement of a verification unit in the design support apparatus according to the second embodiment.

A verification unit 1802 verifies control software on the basis of the log information input by the input device 1801. FIG. 19 is a block diagram showing the specific arrangement of the verification unit 1802.

An I/F unit 1901 inputs log information input from the input device 1801. A timing comparison processing unit 1902 performs comparison processing for the input log information on the basis of the list of control triggers shown in FIG. 16 and the allowable value list shown in FIG. 17.

The verification unit 1802 reads out time information corresponding to a registered trigger from the log information, and compares it with the allowable values registered as a verification item, thereby determining whether the state change falls within the range of the allowable values (the allowable range defined by minimum and maximum values).

A timing chart generating unit 1903 generates information for displaying a timing chart corresponding to FIG. 14A on the basis of the comparison processing result obtained by the timing comparison processing unit 1902. A timing chart display unit 1904 outputs the information generated by the timing chart generating unit 1903 to a display control unit 105.

In this case, the timing comparison processing unit 1902 performs the same processing as that described with reference to the above device driving calculating unit 321. If the timing comparison processing unit 1902 determines that the state change exceeds the allowable range, the timing chart generating unit 1903 receives the determination result.

If the state change exceeds the allowable range, the timing chart generating unit 1903 generates identification display data which can be easily recognized by the designer. The timing chart display unit 1904 receives the identification display data, and inputs the identification display data generated by the timing chart generating unit 1903 to the display control unit 105.

The display control unit 105 displays a timing chart corresponding to FIG. 14A on a display 108 on the basis of the input information for displaying the input timing chart. In addition, upon receiving the identification display data, the display control unit 105 can display, on the display 108, an identification indication for notifying the designer that the state change exceeds the allowable range, together with the timing chart (FIG. 14A).

FIG. 14B is an exemplary view showing an identification indication in a case wherein the verification result of "verifying whether deceleration of the rotating color developing device 933 is complete (T165) before the start of exposure by the laser diode (T166)" exceeds an allowable range. The actually measured value based on the log information is 380, which falls outside the allowable range (allowable value Min=400 and allowable value Max=430), and hence the verification result becomes NG. This identification indication allows to specify a defective portion in device control which exceeds the allowable range.

The designer can register the control triggers shown in FIG. 16 and the allowable ranges shown in FIG. 17 in the input window (not shown) displayed on the display 108 by input operation with a keyboard 106, a mouse 107, or the like. In the input window, as described in the first embodiment, it is possible to use a GUI (Graphical User Interface) to easily set each item.

In the design support apparatus according to this embodiment, the RAM 605 or the like stores data input from the input device 1801 as log information during processing by the CPU 601. However, the gist of the present invention is not limited to this. For example, the apparatus may receive, from the input device 1801, information measured by a measuring device connected to a signal line of a motor, and perform a verification on the basis of the information. Even in an environment which does not allow the use of the software simulation unit 101 which simulates control software as a verification target, this method allows to efficiently verify the control software on the basis of information acquired from the actual apparatus.

This embodiment can efficiently verify control software for controlling an apparatus.

Other Embodiments

The object of the present invention is implemented even by supplying a storage medium storing software program codes for implementing the functions of the above embodiments to a system or apparatus, and causing the computer (or a CPU or an MPU) of the system or apparatus to read out and execute the program codes stored in the storage medium.

In this case, the program codes read out from the storage medium implement the functions of the above embodiments by themselves, and the storage medium storing the program codes constitutes the present invention.

As a storage medium for supplying the program codes, a flexible disk, hard disk, optical disk, magnetooptical disk, CD-ROM, CD-R, nonvolatile memory card, ROM, or the like can be used.

The functions of the above embodiments are implemented not only when the readout program codes are executed by the computer but also when the OS (Operating System) running on the computer performs part or all of actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-254978, filed Sep. 20, 2006, which is hereby incorporated by reference herein in its entirety.

What is claimed is:

1. A design support method of causing an information processing apparatus to execute software for actually controlling an image forming apparatus in order to simulate controlling of a device constituting the image forming apparatus, the method comprising the steps of:

registering, in a storage unit, trigger information for specifying a content of control to be executed when a start condition for switching a control state of the device is satisfied;

registering, in the storage unit, an allowable range of a state change timing of the device due to control switched when the start condition is satisfied; and verifying whether the state change timing of the device due to the control switched when the start condition is satisfied falls outside the allowable range, by referring to an operation state of the device which is input through an input unit, and the trigger information registered in the storage unit, wherein the start condition includes information for specifying the device to be controlled and information for indicating a number of passage times of a sheet that has passed through the device to be controlled.

2. The method according to claim 1, wherein the trigger information includes information specified by a relative positional relationship between the device as a control target and a conveyed recording medium to switch a control state of the device.

3. The method according to claim 1, wherein in the verifying step, it is verified, on the basis of a simulation result on a virtual device modeled to simulate operation of the image forming apparatus by the input unit, whether the state change timing of the device falls outside the allowable range.

4. The method according to claim 1, wherein in the verifying step, it is verified, on the basis of information acquired from a result of operating an actual image forming apparatus by the input unit, whether the state change timing of the device falls outside the allowable range.

5. The method according to claim 1, further comprising the step of causing a display unit to display information for identifying that a verification result obtained in the verifying step falls outside the allowable range.

6. A non-transitory computer-readable storage medium which stores a design support program which causes a computer to execute the design support method defined in claim 1.

7. A design support apparatus which causes an information processing apparatus to execute software for actually controlling an image forming apparatus in order to simulate controlling of a device constituting the image forming apparatus, the design support apparatus comprising:
- a trigger information registration unit adapted to register, in a storage unit, trigger information for specifying a content of control to be executed when a start condition for switching a control state of the device is satisfied;
- an allowable value registration unit adapted to register, in the storage unit, an allowable range of a state change timing of the device due to control switched when the start condition is satisfied; and
- a verification unit adapted to verify whether the state change timing of the device due to the control switched when the start condition is satisfied falls outside the allowable range, by referring to an operation state of the device which is input through an input unit, and the trigger information registered in the storage unit, wherein the start condition includes information for specifying the device to be controlled and information for indicating a number of passage times of a sheet that has passed through the device to be controlled.

8. The apparatus according to claim 7, wherein the trigger information includes information specified by a relative positional relationship between the device as a control target and a conveyed recording medium to switch a control state of the device.

9. The apparatus according to claim 7, wherein said verification unit verifies, on the basis of a simulation result on a virtual device modeled to simulate operation of the image forming apparatus by the input unit, whether the state change timing of the device falls outside the allowable range.

10. The apparatus according to claim 7, wherein said verification unit verifies, on the basis of information acquired from a result of operating an actual image forming apparatus by the input unit, whether the state change timing of the device falls outside the allowable range.

11. The apparatus according to claim 7, further comprising a display control unit adapted to cause a display unit to display information for identifying that a verification result obtained by said verification unit falls outside the allowable range.

* * * * *